US012637392B2

(12) United States Patent
Ceylan et al.

(10) Patent No.: US 12,637,392 B2
(45) Date of Patent: May 26, 2026

(54) ELECTRICALLY-CONDUCTIVE ASPHALT CONCRETE CONTAINING CARBON FIBERS

(71) Applicant: IOWA STATE UNIVERSITY RESEARCH FOUNDATION, INC., Ames, IA (US)

(72) Inventors: Halil Ceylan, Ames, IA (US); Ali Arabzadeh, Ames, IA (US); Sunghwan Kim, Ames, IA (US); Alireza Sassani, Ames, IA (US); Kasthurirangan Gopalakrishnan, Mangalagiri (IN); Mohammad Ali Notani, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 19/018,401

(22) Filed: Jan. 13, 2025

(65) Prior Publication Data

US 2025/0206667 A1 Jun. 26, 2025

Related U.S. Application Data

(62) Division of application No. 16/931,179, filed on Jul. 16, 2020, now Pat. No. 12,234,190.

(Continued)

(51) Int. Cl.
| | |
|---|---|
| *C04B 26/26* | (2006.01) |
| *C04B 14/38* | (2006.01) |

(Continued)

(52) U.S. Cl.
CPC ............ *C04B 26/26* (2013.01); *C04B 14/386* (2013.01); *C04B 18/02* (2013.01); *C04B 20/006* (2013.01);

(Continued)

(58) Field of Classification Search
CPC ....................................................... C04B 26/26
See application file for complete search history.

(56) References Cited

U.S. PATENT DOCUMENTS

| | | |
|---|---|---|
| 3,166,518 A | 1/1965 | Barnard |
| 3,573,427 A | 4/1971 | Minsk |
| | (Continued) | |

FOREIGN PATENT DOCUMENTS

| | | |
|---|---|---|
| CN | 102432239 A | 5/2012 |
| CN | 108358556 A | 8/2018 |
| | (Continued) | |

OTHER PUBLICATIONS

Yehia et al., "Thin Conductive Concrete Overlay for Bridge Deck Deicing and Anti-Icing," *Transp. Res. Rec.* 1698:45-53 (2000).

(Continued)

*Primary Examiner* — William D Young

(74) *Attorney, Agent, or Firm* — Troutman Pepper Locke LLP (Rochester)

(57) ABSTRACT

The present application relates to an electrically conductive asphalt mastic (ECAM) composition that includes an asphalt binder, a mineral filler, and a plurality of conductive carbon microfibers, between 3 and 12 mm in length, which are the sole source of electrical conductivity in the ECAM composition where the conductive carbon microfibers and the mineral filler are dispersed in the asphalt binder, and wherein said conductive carbon microfibers are present in the ECAM composition in an amount of less than 2.00% of total volume of the ECAM composition. The application further relates to an electrically conductive asphalt concrete (ECAC) composition that includes an asphalt binder, a mineral filler, an aggregate, and a plurality of conductive carbon microfibers, where the conductive carbon microfibers are the sole source (Continued)

of electrical conductivity in the electrically conductive asphalt concrete composition.

18 Claims, 10 Drawing Sheets

Related U.S. Application Data

(60) Provisional application No. 62/878,903, filed on Jul. 26, 2019.

(51) Int. Cl.
| | |
|---|---|
| *C04B 18/02* | (2006.01) |
| *C04B 20/00* | (2006.01) |
| *C04B 111/94* | (2006.01) |

(52) U.S. Cl.
CPC ......... *C04B 20/008* (2013.01); *C04B 2111/94* (2013.01)

(56) References Cited

U.S. PATENT DOCUMENTS

| | | | |
|---|---|---|---|
| 3,962,142 | A | 6/1976 | Freeman et al. |
| 4,564,745 | A | 1/1986 | Deschenes |
| 4,571,860 | A | 2/1986 | Long |
| 5,032,181 | A | 7/1991 | Chung |
| 5,346,547 | A | 9/1994 | McCormack |
| 5,447,564 | A | 9/1995 | Xie et al. |
| 5,590,832 | A | 1/1997 | Fiedrich |
| 5,707,171 | A | 1/1998 | Zaleski et al. |
| 5,759,259 | A | 6/1998 | Sychra et al. |
| 5,908,584 | A | 6/1999 | Bennett |
| 6,074,469 | A | 6/2000 | Collins et al. |
| 6,193,793 | B1 | 2/2001 | Long et al. |
| 6,461,424 | B1 | 10/2002 | Ramme et al. |
| 6,503,318 | B2 | 1/2003 | Pye et al. |
| 6,821,336 | B1 | 11/2004 | Ramme et al. |
| 6,825,444 | B1 | 11/2004 | Tuan et al. |
| 7,241,337 | B1 | 7/2007 | Bardine et al. |
| 7,578,881 | B2 | 8/2009 | Ramme |
| 9,681,592 | B2 | 6/2017 | Tuan et al. |
| 9,775,196 | B2 | 9/2017 | Song et al. |
| 2004/0099982 | A1 | 5/2004 | Sirola et al. |
| 2005/0013661 | A1 | 1/2005 | Saito et al. |
| 2006/0231966 | A1 | 10/2006 | Tsung |
| 2007/0240620 | A1 | 10/2007 | Ramme |
| 2007/0242620 | A1 | 10/2007 | Ramme |
| 2015/0152264 | A1* | 6/2015 | Wilson ..................... C08K 3/36 106/276 |
| 2017/0260747 | A1 | 9/2017 | Gentry et al. |
| 2020/0262753 | A1 | 8/2020 | Ceylan et al. |

FOREIGN PATENT DOCUMENTS

| | | | |
|---|---|---|---|
| JP | H06101206 | A | 4/1994 |
| WO | WO 9014321 | A1 | 11/1990 |
| WO | WO 2006091185 | A1 | 8/2006 |
| WO | WO 2010/059169 | A1 | 5/2010 |

OTHER PUBLICATIONS

Yehia et al., "Airfield Pavement Deicing with Conductive Concrete Overlay," Civil Engineering Faculty Proceedings & Presentations 2 (2002).

Chang et al., "Improvement of Electrical Conductivity in Carbon Fiber-Concrete Composites Using Self Consolidating Technology," Earth Sp. 2010 Eng. Sci. Constr. Oper. Challenging Environ. ASCE 3553-3558 (2010).

Sun et al., "Deicing Concrete Pavement Containing Carbon Black/Carbon Fiber Conductive Lightweight Concrete Composites," ICTIS 2011 Multimodal Approach to Sustain. Transp. Syst.Dev. Information, Technol. Implement., 662-668 (2011).

Chen et al., "Performances of Electrically Conductive Concrete with Layered Stainless Steel Fibers," *Sustain. Constr. Mater.* 163-171 (2012).

Won et al., "Thermal Characteristics of a Conductive Cement-Based Composite for a Snow-Melting Heated Pavement System," *Compos. Struct.* 118:106-111 (2014).

Tumidajski et al., "Overlay Current in a Conductive Concrete Snow Melting System," *Cem. Concr. Res.* 33:1807-1809 (2003).

C.Y. Tuan, "Roca Spur Bridge: The Implementation of an Innovative Deicing Technology," *J. Cold Reg. Eng.* 22:1-15 (2008).

Maggenti et al., "Development of Conductive Polyester Concrete for Bridge-Deck Cathodic Protection and Ice Control," *Transp. Res. Rec.* 1597:61-69 (1997).

Heymsfield et al., "Feasibility of Anti-Icing Airfield Pavements Using Conductive Concrete and Renewable Solar Energy," *Final Report*, 1-65 (2013).

Galao et al., "Highly Conductive Carbon Fiber Reinforced Concrete for Icing Prevention and Curing," *Materials* 9:281 (2016).

Wu et al., "Three-Phase Composite Conductive Concrete for Pavement Deicing," *Constr. Build. Mater.* 75:129-135 (2015).

Chung, "Electrically Conductive Cement-Based Materials," *Adv. Cem. Res.* 4:167-176 (2004).

Hambach et al., "Carbon Fibre Reinforced Cement-Based Composites as Smart Floor Heating Materials," *Composits Part B* 90:465-470 (2016).

Sadati et al., "Energy and Thermal Performance Evaluation of an Automated Snow and Ice Removal System at Airports Using Numerical Modeling and Field Measurements," *Sustainable Cities and Society* 43:238-250 (2018).

Abdualla et al., "Design and Construction of the World's First Full-Scale Electrically Conductive Concrete Heated Airport Pavement System at a US Airport," *Journal of the Transportation Research Board* 2672(23):82-94 (2018).

Nahvi et al., "Towards Resilient Infrastructure Systems for Winter Weather Events: Integrated Stochastic Economic Evaluation of Electrically Conductive Heated Airfield Pavements," *Sustainable Cities and Society* 41:195-204 (2018).

Sassani et al., "Development of Carbon Fiber-Modified Electrically Conductive Concrete for Implementation in Des Moines International Airport," *Case Studies in Construction Materials* 8:277-291 (2018).

Sassani et al., "Influence of Mix Design Variables on Engineering Properties of Carbon Fiber-Modified Electrically Conductive Concrete," *Construction & Building Materials*, 152:168-181 (2017).

Shen et al., "Life Cycle Assessment of Heated Apron Pavement System Operations," *Transportation Research Part D* 48:316-331 (2016).

Abdualla et al., "System Requirements for Electrically Conductive Concrete Heated Pavements," *Transportation Research Record: Journal of the Transportation Research Board* 2569:70-79 (2016).

Gopalakrishnan et al., "Electrically Conductive Mortar Characterization for Self-Heating Airfield Concrete Pavement Mix Design," *Int. J. Pavement Res.Technol.* 8(5):315-324 (2015).

Abdualla et al., "Construction Techniques for Electrically Conductive Heated Pavement Systems," Construction Research Congress 2018, New Orleans, Louisiana, Apr. 2-5, 2018.

Sadati et al., "Numerical Modeling of Electrically Conductive Pavement Systems," ASCE Congress on Technical Advancement 2017, Duluth, MN, Sep. 10-13, 2017.

Abdualla et al., "Configuration of Electrodes for Electrically Conductive Concrete Heated Pavement Systems," ASCE International Conference on Highway Pavements and Airfield Technology 2017, Philadelphia, PA, Aug. 27-30, 2017.

Sassani et al., "Factorial Study on Electrically Conductive Concrete Mix Design for Heated Pavement Systems," 96th Annual Meeting of Transportation Research Board, Transportation Research Board, NRC, TRB Paper 17-05347:1-16, Washington, D.C., Jan. 8-12, 2017.

Abdualla et al., "Development of a Finite Element Model for Electrically Conductive Concrete Heated Pavements," 96th Annual

(56)  References Cited

OTHER PUBLICATIONS

Meeting of Transportation Research Board, Transportation Research Board, NRC, TRB Paper 17-05389:1-13, Washington, D.C., Jan. 8-12, 2017.
Shen et al., "Airport Apron Heated Pavement System Operations: Analysis of Energy Consumption, Greenhouse Gas Emissions, and Operating Costs," Geo-Chicago 2016 Conference, Chicago, Illinois, Aug. 14-18, 2016, pp. 513-522.
Ceylan et al., "Project 01 Heated Airport Pavements," PEGASAS Quarterly Meeting, Ames, Iowa, Jul. 25-26, 2013.
Gopalakrishnan et al., "Self-Heating Electrically Conductive Concrete for Pavement Deicing: A Revisit," 94rd Annual Meeting of the Transportation Research Board, Transportation Research Board, NRC, TRB Paper 15-4764:1-15, Washington, D.C., Jan. 11-15, 2015.
Ceylan et al., "Heated Transportation Infrastructure Systems: Existing and Emerging Technologies," 12th International Symposium on Concrete Roads, Prague, Czech Republic, Sep. 23-26, 2014.
Shen et al., "Greenhouse Gas Emission Analysis for Heated Pavement System," The 2014 FAA Worldwide Airport Technology Transfer Conference, Galloway, New Jersey, Aug. 5-7, 2014.
Abdullah et al., "Electrically Heated Concrete Pavement System at Des Moines International Airport," Poster presentation, 2017 Mid-Continent Transportation Research Symposium, Ames, Iowa, Aug. 16-17, 2017.
Sadati et al., "Numerical Modeling of Electrically Conductive Concrete," Poster presentation, FAA PEGASAS COE 5th Annual Meeting, Texas A&M University, College Station, Texas, May 23-25, 2017.
Abdualla et al., "Full-Scale Demonstration of Electrically Conductive Concrete at Des Moines International Airport," Poster presentation, FAA PEGASAS COE 5th Annual Meeting, Texas A&M University, College Station, Texas, May 23-25, 2017.
Sassani et al., "Electrically Conductive Concrete (ECON) for Application in Airport Heated Pavement Systems," Poster presentation, 11th International Conference on Concrete Pavements (ICCP11), San Antonio, Texas, Aug. 28-31, 2016.
Abdualla et al., "Electrically Conductive Concrete Based Heated Pavements: Design, Construction, and Evaluation," Poster presentation, FAA PEGASAS COE 4th Annual Meeting, Iowa State University, Ames, Iowa, Jun. 7-9, 2016.
Sassani et al., "Optimization of Electrically Conductive Concrete (ECON) for Heated Pavement Systems," Poster presentation, FAA PEGASAS COE 4th Annual Meeting, Iowa State University, Ames, Iowa, Jun. 7-9, 2016.
Abdualla et al., "System Level Design and Performance Evaluation of Electrical Heated Pavement Systems," Poster presentation, 5th Annual Civil, Construction and Environmental Engineering (CCEE) Graduate Research Showcase and Poster Competition, Iowa State University, Ames, Iowa, Dec. 3, 2015.
Sassani et al., "Application of Nano-Engineered Materials in Heated Concrete Pavement Systems," Poster presentation, 5th Annual Civil, Construction and Environmental Engineering (CCEE) Graduate Research Showcase and Poster Competition, Iowa State University, Ames, Iowa, Dec. 3, 2015.
Sassani et al., "Optimization of Electrically Conductive Concrete (ECC) Mix Design for Self-Heating Pavement Systems," Mid-Continent Transportation Research Symposium, ISU, Ames, Iowa, Aug. 19-20, 2015.
Abdualla et al., "Design and Construction Requirements for Electrically Heated Pavement Systems," Poster presentation, Mid-Continent Transportation Research Symposium, ISU, Ames, Iowa, Aug. 19-20, 2015.
Abdalla et al., "Advanced Construction Techniques for Heated Pavement Systems," Poster presentation, 3rd Annual Meeting, Purdue University, West Lafayette, Indiana, May 27-28, 2015.
Sassani et al., "Use of Nano-Engineered Materials for Functional Enhancements of Pavement Systems," Poster presentation, 3rd Annual Meeting, Purdue University, West Lafayette, Indiana, May 27-28, 2015.

Sassani et al., "A Functional Electrically Conductive Concrete (ECON) for Heated Pavement Systems," Poster presentation, 3rd Annual Meeting, Purdue University, West Lafayette, Indiana, May 27-28, 2015.
Shen et al., "Sustainability Assessment of Heated Pavements: Operations for Snow Removal Applications," Poster presentation, 3rd Annual Meeting, Purdue University, West Lafayette, Indiana, May 27-28, 2015.
Anand et al., "Energy and Financial Viability of Heated Airport Pavements," Poster presentation, 3rd Annual Meeting, Purdue University, West Lafayette, Indiana, May 27-28, 2015.
Sassani et al., "Mix Design Development of Electrically Conductive Concrete (ECC)," Poster presentation, 4th Annual Civil, Construction and Environmental Engineering (CCEE) Graduate Research Showcase and Poster Competition, Iowa State University, Ames, Iowa, Dec. 2, 2014.
Abdualla et al., "Advanced Construction Techniques for Heated Pavements," Poster presentation, 4th Annual Civil, Construction and Environmental Engineering (CCEE) Graduate Research Showcase and Poster Competition, Iowa State University, Ames, Iowa, Dec. 2, 2014.
Yang et al., "Conductive Concrete for Heated Airport Pavement Systems," Poster presentation, 2nd Annual Meeting of PEGASAS, Georgia Institute of Technology, Atlanta, Georgia, Jun. 3-5, 2014.
Shen et al., "Greenhouse Gas Emission Analysis for Operation of Geothermal Heated Pavement Systems," Poster presentation, 2nd Annual Meeting of PEGASAS, Georgia Institute of Technology, Atlanta, Georgia, Jun. 3-5, 2014.
Anand et al., "Economic Analysis Framework of Heated Airport Pavement Systems," Poster presentation, 2nd Annual Meeting of PEGASAS, Georgia Institute of Technology, Atlanta, Georgia, Jun. 3-5, 2014.
Shen et al. "Heated Pavement System Operations: Analysis of Carbon Emissions," Poster presentation, 2014 Iowa State University Symposium on Sustainability: Celebrating Our STARS, Charting Our Course, Ames, Iowa, Feb. 24-25, 2014.
Cord et al. "Achieving Ice-Free Pavement Surfaces Through the Use of Sustainable Technologies," Poster presentation, 2014 Iowa State University Symposium on Sustainability: Celebrating Our STARS, Charting Our Course, Ames, Iowa, Feb. 24-25, 2014.
Quirke, J., "Electric Concrete Tested at US Airport to Melt Snow", Global Construction Review, Mar. 22, 2018.
Watts, A., "New Heated Airport Runway Concept May Sharply Bias 'Global Warming' Signal in the Global Climate Monitoring Network," Watts Up With That? Feb. 23, 2018.
Rossen et al., "Could Heated Airport Runways Melt Away your Winter Travel Headaches?," NBC Today, Jan. 26, 2018.
"Safer, More Sustainable Aviation. Iowa State's Partnership in FAA Program Advances Airport Runways, Operating Technology," Iowa State University College of Engineering Research, Jan. 8, 2018.
Aguirre, J., "Middle Bit: Heated Pavement Technology Tests Well at Des Moines Airport," Clay and Milk, Jan. 5, 2018.
"Des Moines Airport Testing Heated Pavement," WHO-TV, Jan. 5, 2018.
Magel,T., "Heated Pavement Tech Could be Travelers' Dream Come True," KCCI 8 News, Jan. 5, 2018.
"Heated Pavements Working at Des Moines Airport," KCRG News, Jan. 5, 2018.
Ford, G., "Iowa Airports Going Green, Saving on Energy Costs," The Gazette, Nov. 25, 2017.
Yu, A., "Winter is Coming. What if Roads and Runways Could De-Ice Themselves?," NPR, Oct. 1, 2017.
Rizzo C., "Electric Concrete at Airports Could Save us all From Winter Fight Delays," Travel+Leisure, Apr. 18, 2017.
Davis, A., "Iowa State Engineers Test Heated Pavement Technology at Des Moines International Airport," Highway Today, Apr. 1, 2017.
Coxworth, B., "Electrified Concrete May Keep Airports Ice-Free," News ATLAS, Mar. 30, 2017.
"Iowa State Engineers Test Heated Pavement Technology at Des Moines International Airport," Newswise, Mar. 28, 2017.
"Iowa State Engineers Test Heated Pavement Technology at Des Moines International Airport," Iowa State news service, Mar. 28, 2017.

(56) References Cited

OTHER PUBLICATIONS

"Heat Pavement Technology Could Melt Away Airport Headaches," *WHO-TV*, Mar. 28, 2017.

Iowa State University, "Heated Pavement Technology Tested at Des Moines International Airport," *ScienceDaily*, Mar. 28, 2017.

Ceylan et al., "Innovative and Sustainable Airfield Pavement Engineering Solutions," *International Airport Review*, May 24, 2016.

Ceylan, H., "Iowa State Engineers Developing Pavement Technologies to Clear Snow and Ice From Runways," *Innovations Report*, Apr. 3, 2015.

Moore, J., "Just Melt it. Iowa State Tests New Snow Removal Methods," *AOPA*, Mar. 18, 2015.

Satre, Z., "ISU Researchers Develop Snow-Free Pavement Technologies," *Iowa State Daily*, Mar. 12, 2015.

"ISU Researchers Hope to Prevent Icy Airport Runways," *Ames Tribune*, Mar. 7, 2015.

Chandler, R., "Iowa State University Students Developing Heated Pavement Technology," *WHO-TV*, Mar. 5, 2015.

Rantala, J., "Researchers Work to Eliminate the Snow Shovel," *KCCI 8 News*, Mar. 4, 2015.

"Iowa State Researchers Study Heated Pavement as Possible Solution to Flight Delays," *The Gazette*, Mar. 4, 2015.

Abdualla et al., "Design and Construction of the World's First Full-Scale Electrically Conductive Concrete Heated Airport Pavement System at a U.S. Airport," *Transportation Research Record* 2672(23):82-94 (2018).

"Iowa State Engineers Developing Pavement Technologies to Clear Snow and Ice from Runways," *Iowa State University News Service*, Mar. 2, 2015.

Iowa State University, "Electrically Conductive Concrete to Clear Snow and Ice From Runways," *Science Daily*, Mar. 2, 2015.

Abdualla, "Design, Construction, and Performance of Heated Concrete Pavements System," Thesis May 2018.

Theh et al., "Electrical Safety of Electrically Conductive Concrete at Des Moines International Airport," Poster presentation, FAA PEGASAS COE 6th Annual Meeting, Purdue University, West Lafayette, Indiana May 22-24, 2018.

Ceylan et al., "Snow and Ice Preventive Pavement Systems: PEGASAS FAA COE Project No. 1 Heated Airport Pavements," Purdue Road School Transportation Conference and Expo, Mar. 10-12, 2015.

Ceylan, H., "PEGASAS FAA COE Project 1: Heated Airport Pavements", 2015 PEGASAS Annual Meeting, May 28, 2015.

Abdualla et al., "Development of Construction Techniques for Electrically Conductive Heated Concrete Pavements," 98th Annual meeting of Transportation Research Board, Transportation Research Board, NRC, Paper No. 19-01184; 1-7, Washington, D.C., Jan. 13-17, 2019.

Abdualla et al., "Hydronic Heated Pavement System Using Precast Concrete Pavement for Airport Applications," International Conference on Transportation and Development 2018, Pittsburgh, Pennsylvania, July 15-18, p. 16-24 (2018).

Abdualla et al., "Electrically Conductive Concrete Heated Pavement System Using Two-Lift Construction Technology," 13th International Symposium on Concrete Roads, Berlin, Germany, Jun. 19-22, 2018.

Ceylan, H., "PEGASAS FAA COE Project No. 1: Heated Airport Pavements," PEGASAS Annual Meeting, Texas A&M University, May 23-25, 2017.

Ceylan, H., "PEGASAS FAA COE Project No. 1: Heated Airport Pavements," PEGASAS Annual Meeting, Iowa State University, Jun. 7-9, 2016.

Ceylan, H., "Heated Pavements," 2015 Iowa Better Concrete Conference, Iowa State University, Ames, IA, Nov. 12, 2015.

Ceylan, H. "First Large Scale Demonstration Project Electrically Conductive Concrete Heated Airport Pavement System at Des Moines International Airport: Design, Construction and Performance," 2017 Better Concrete Conference, Iowa State University, Ames, Iowa, Nov. 9, 2017.

Ceylan, H. "PEGASAS FAA COE Project No. 1: Heated Airport Pavements," 2014 PEGASAS Annual Meeting, Jun. 4, 2014.

Ceylan et al., "PEGASAS FAA COE Project No. 1: Heated Airport Pavements," Site Visit by Dave Atwood (Program Lead, NextGen Alternative Fuels for General Aviation), Iowa State University, Ames, Iowa, Nov. 25-26, 2013.

Ceylan, H. "PEGASAS: FAA COE Project 1: Heated Airport Pavements," PEGASAS: FAA COE 1st Annual Meeting, Ohio State University, Columbus, Ohio, Sep. 16- 19, 2013.

Ceylan et al., "Heated Transportation Infrastructure: Prevention of Ice Formation on Paved Surfaces," 2013 Mid-Continent Transportation Research Symposium, Ames, Iowa, Aug. 15-16, 2013.

Ceylan et al., "Hybrid Heated Airport Pavement System," ISU PEGASAS site visit, Ames, Iowa, Mar. 22, 2013.

Sassani, A. "Smart Materials for Heated Concrete Pavement Systems," Thesis (2018).

Anand et al., "Energy and Financial Viability of Hydronic Heated Pavement Systems," DOT/FAA/TC-17/47, Federal Aviation Administration (2017).

Shen et al., "Sustainability Assessment of Alternative Snow-Removal Methods for Airport Apron Paved Surfaces," DOT/FAA/TC-17/34, Federal Aviation Administration (2017).

Sassani et al., "Designing and Proportioning Electrically Conductive Concrete for Des Moines International Airport Heated Pavement System," 97th Annual meeting of Transportation Research Board, Transportation Research Board, NRC, Washington, D.C., Jan. 7-11, 2018.

Vigar, L., "FAA Grant Funds Research for Heated Airport Pavements," *Iowa State Daily*, Oct. 9, 2013.

Sassani et al., "Carbon Fiber-Based Electrically Conductive Concrete for Salt-Free Deicing of Pavements," *Journal of Cleaner Production* 203:799-809 (2018).

Anand et al., "Economic Assessment of Heated Pavements for the Minneapolis—St. Paul International Airport," International Conference on Transportation and Development p. 128-139 (2016).

Anand et al., "Cost Comparison of Alternative Airfield Snow Removal Methodologies," 2014 FAA Worldwide Airport Technology Transfer Conference, Galloway, New Jersey, Aug. 5-7, 2014.

Dean, A. "1$^{st}$ Full-Scale Heated Pavement Slabs Installed at American International Airport," *International Society for Concrete Pavements*, Mar. 30, 2017.

Arabzadeh et al., "Electrically-Conductive Asphalt Mastic: Temperature Dependence and Heating Efficiency," Mat. Design 157:303-313 (2018).

Arabzadeh et al., "Investigating the Heat Generation Efficiency of Electrically-Conductive Asphalt Mastic Using Infrared Thermal Imaging," International Conference on Transportation and Development 206-214 (2018).

Liu et al., "Induction Healing of Asphalt Mastic and Porous Asphalt Concrete," Construction and Building Materials 25:3746-3752 (2011).

Liu et al., "Self-Monitoring Application of Conductive Asphalt Concrete Under Indirect Tensile Deformation," Case Studies in Construction Materials 3:70-77 (2015).

Pan et al., "Conductive Asphalt Concrete: A Review on Structural Design, Performance, and Practical Applications," J. Intell. Sys. Struct. 26(7):755-769 (2015).

Wu et al., Analysis of Characteristics of Electrically Conductive Asphalt Concrete Prepared by Multiplex Conductive Materials, J. Mater. Civ. Eng. 25(7):871-879 (2013).

Wu et al., "Investigation of the Conductivity of Asphalt Concrete Containing Conductive Fillers," Carbon 43:1358-1363 (2005).

Liu et al., "Study on the Graphite and Carbon Fiber Modified Asphalt Concrete," Construction and Building Materials 25:1807-1811 (2011).

Liu et al., "Self-Monitoring Application of Asphalt Concrete Containing Graphite and Carbon Fibers," Journal of Wuhan University of Technology—Mater. Sci. Ed. 23(2):268-271 (2008).

Arabzadeh et al., "Comparison Between Cement Paste and Asphalt Mastic Modified by Carbonaceous Materials: Electrical and Thermal Properties," Construction and Building Materials 213:121-130 (2019).

Arabzadeh, "Mitigating the Winter Maintenance Problems of Airports Through Optimizing the Resistive Heating Capability of

(56) References Cited

OTHER PUBLICATIONS

Electrically Conductive Asphalt Concrete," Transportation Research Board 97th Annual Meeting, AFD60 subcommittee meeting, Jan. 8, 2018, Washington DC, USA.

Notani et al., "Effect of Carbon-Fiber Properties on Volumetrics and Ohmic Heating of Electrically Conductive Asphalt Concrete," J. Mater. Civ. Eng., 31(9):04019200 (2019).

Arabzadeh, "Nano-Engineered Heated Pavements," Thesis (Jul. 31, 2019).

Rantala, J., "See How New Melting Technologies Work," KCCI 8 News, Mar. 3, 2015 (https://www.kcci.com/article/see-how-new-melting-technologies-work/6437447).

Ivorra et al., "Effect of Silica Fume Particle Size on Mechanical Properties of Short Carbon Fiber Reinforced Concrete," Materials and Design 31:1553-1558 (2010).

Prof. B. V. Venkatarama Reddy, "Stability of Manufactured Sand (M-Sand) As Fine Aggregate in Mortars and Concrete", Department of Civil Engineering, Indian Institute of Science (2012).

\* cited by examiner

Source A             Source B

FIG. 3A                  FIG. 3B

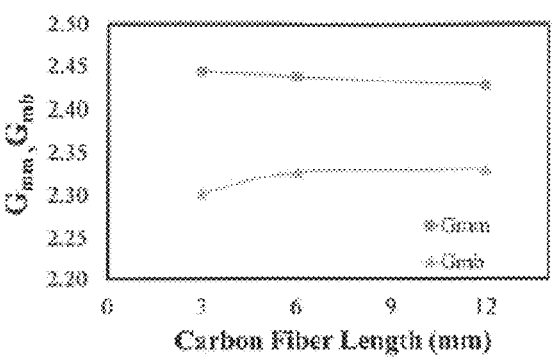
FIG. 5A
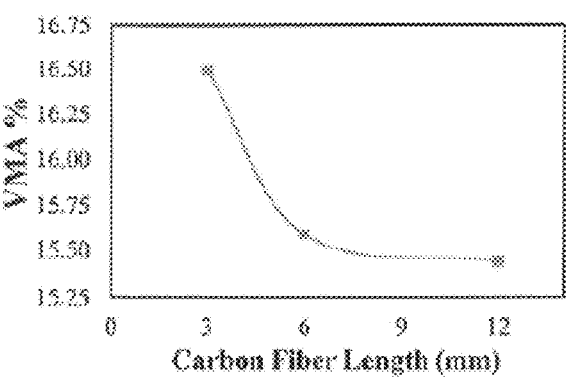
FIG. 5C
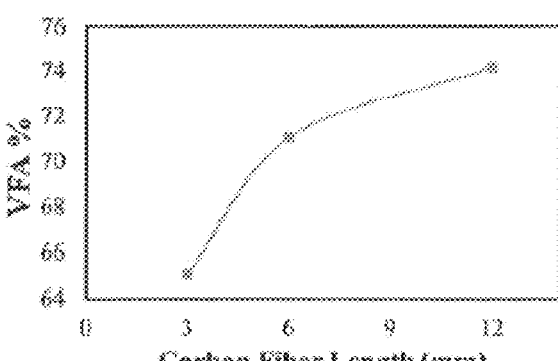
FIG. 5B
FIG. 5D

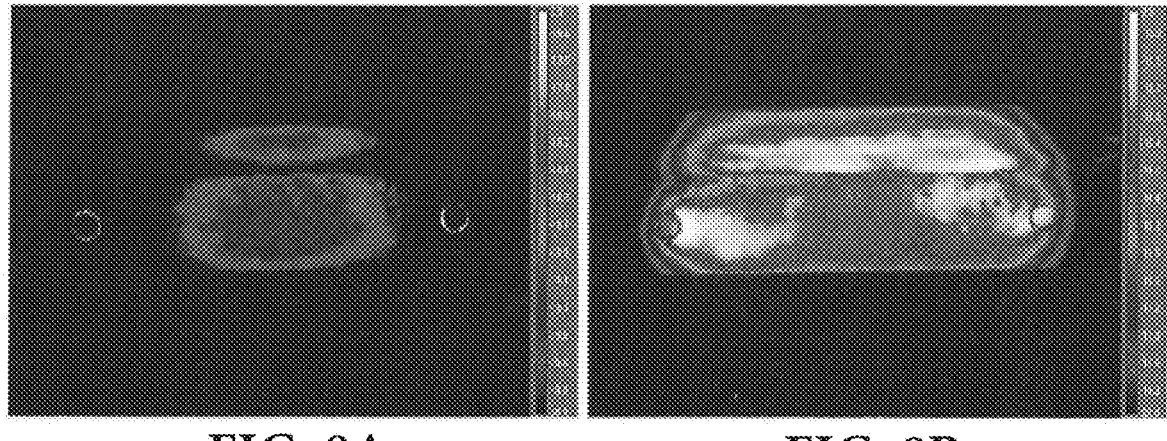
FIG. 8A                              FIG. 8B
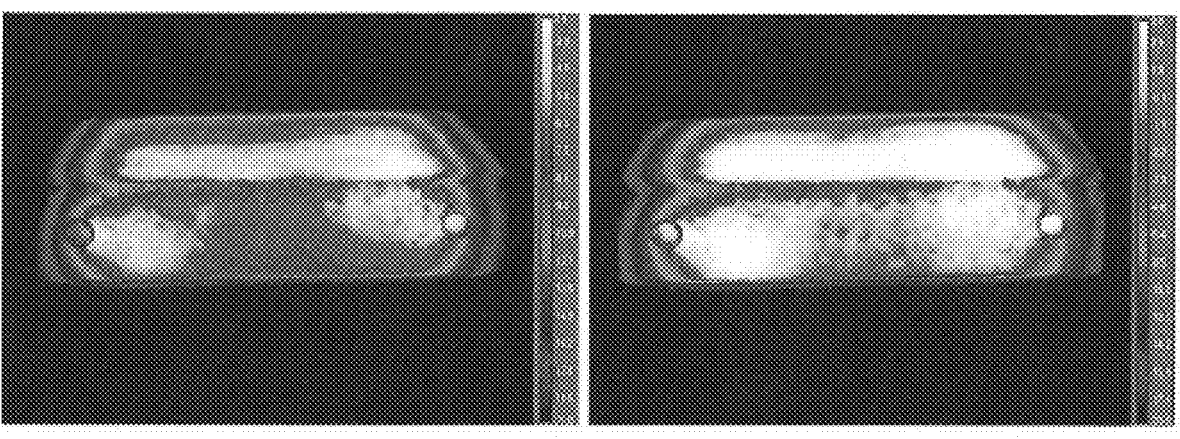
FIG. 8C                              FIG. 8D

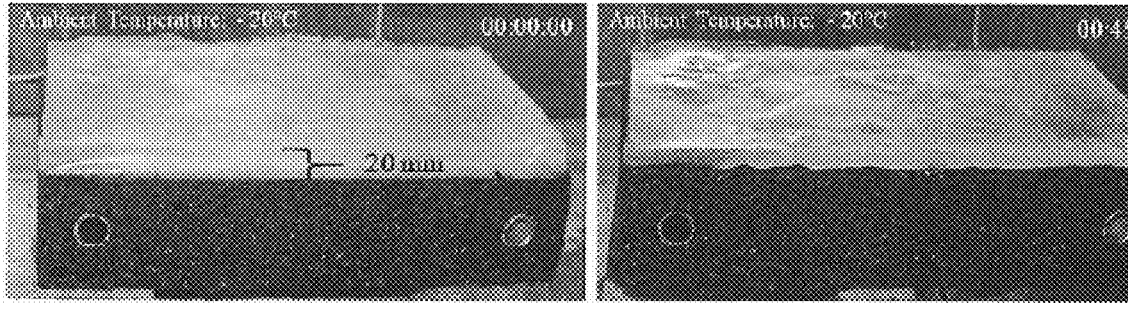
FIG. 9A                    FIG. 9B
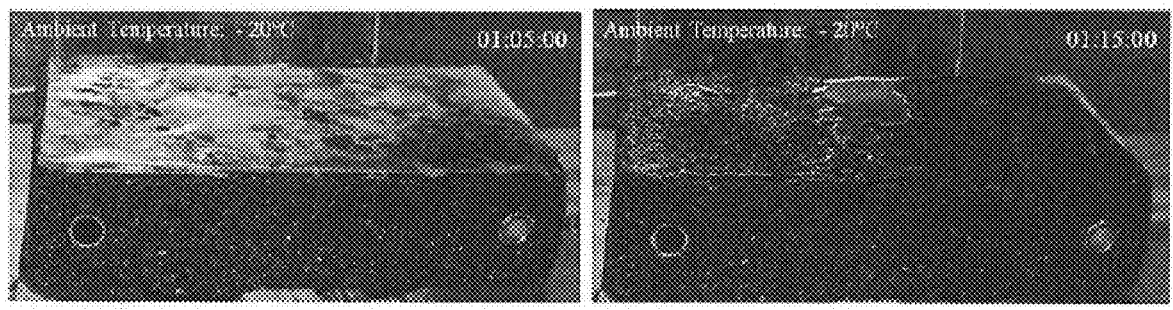
FIG. 9C                    FIG. 9D

ELECTRICALLY-CONDUCTIVE ASPHALT CONCRETE CONTAINING CARBON FIBERS

This application is a divisional of U.S. patent application Ser. No. 16/931,179, filed Jul. 16, 2020, which claims priority benefit of U.S. Provisional Patent Application No. 62/878,903, filed Jul. 26, 2019, which are hereby incorporated by reference in their entirety.

This invention was made with government support under Grant No. 12-C-GA-ISU awarded by Federal Aviation Administration. The government has certain rights in the invention.

FIELD

The present application relates to electrically-conductive asphalt concrete containing carbon fibers.

BACKGROUND

Conventional asphalt concrete is not electrically-conductive, but is highly resistive owing to the high electrical resistivity of its components such as aggregate, asphalt binder and mineral filler. Electrical resistivity of asphalt concrete can be significantly reduced, through the addition of conductive materials such as powders, fibers, and solid particles. Pan et al., "Conductive Asphalt Concrete: A Review on Structure Design, Performance, and Practical Applications," *J. Intell. Mater. Syst. Struct.* 26(7):755-769 (2015). Experimental studies on electrically-conductive asphalt concrete ("ECAC") reported in the literature indicate that optimization of ECAC mix design to achieve high conductivity (for pavement deicing applications), and at the same time maintain adequate mechanical properties, is a challenging task warranting thorough and detailed experimental investigations. García et al., "Electrical Conductivity of Asphalt Mortar Containing Conductive Fibers and Fillers," *Constr. Build. Mater.* 23(10):3175-3181 (2009) and Huang et al., "Effects of Electrically Conductive Additives on Laboratory-Measured Properties of Asphalt Mixtures," *J. Mater. Civ. Eng.* 21(10):612-617 (2009). According to the existing literature (Pan et al., "Conductive Asphalt Concrete: A Review on Structure Design, Performance, and Practical Applications," *J. Intell. Mater. Syst. Struct.* 26(7):755-769 (2015)), conductive materials incorporated into ECAC can broadly be categorized as: (a) powders—e.g., graphite and carbon black ("CB"); (b) fibers—e.g., carbon fiber ("CF"), steel fiber ("SF"), and carbon nano-fiber ("CNF"); (c) shavings—e.g., steel shaving ("SS"); and (d) solid particles (substituting for coarse aggregate in part)—e.g., steel slag and marconite. Considering the wide variety of available conductive materials, it is of paramount importance to identify conductive materials with their associated costs, and rate these materials regarding their potential for achieving economic and efficient heated pavements—based on literature review results, experimental results and material supplier recommendations. Following such a rating system, the highest ranked conductive materials can be selected for development of ECAC.

It is also inferred that the use of large quantities of a single conductive material—to achieve higher conductivity in asphalt mixtures—not only is cost-prohibitive, but can also degrade the mechanical performance. Although several mixing procedures have been randomly explored by previous research studies, there is no systematic guidance or specification available on the optimal mixing technology for ECAC. One study (Pan et al., "Conductive Asphalt Concrete: A Review on Structure Design, Performance, and Practical Applications," *J. Intell. Mater. Syst. Struct.* 26(7): 755-769 (2015)), for example, indicated that the desirable mixing procedure is one that can disperse the conductive fillers uniformly in asphalt mixture without increasing the mixing temperature and asphalt content excessively. Two mixing procedures have been typically employed for preparing ECAC specimens at the lab: dry and wet mixing methods. In the dry mixing procedure (Zhang, Y., "Preparation and Properties Investigation of Multiplex Electrically Conductive Asphalt Concrete," Wuhan University of Technology (2010)) conductive materials are either mixed with dry aggregate before adding asphalt binder or they are added directly to the asphalt and aggregate mixture. The wet mixing procedure (Jamal et al., "The Impact of Carbon Nano-Fiber Modification on Asphalt Binder Rheology," *Constr. Build. Mater.* 30:257-264 (2012)), on the other hand, entails introducing the conductive materials into the asphalt binder matrix, and then adding the modified binder into aggregate for final mixing.

It is believed that CF is the best conductivity enhancement material, when used in asphalt concrete. Wu et al., "Investigation of the Conductivity of Asphalt Concrete Containing Conductive Fillers," *Carbon N. Y.* 43(7):1358-1363 (2005). However, in the current level of the technology, there is no single report on using carbon fiber ("CF") for producing electrically-conductive asphalt concrete ("ECAC"). In fact, all the prior art has disclosed that only graphite at high weight percentages can be used for producing ECAC. For example, the majority of attempts to produce ECAC have been limited to, respectively, using a single type of graphite (at a graphite-to-mixture weight ratio of 22-30%) (see, e.g., U.S. Pat. No. 3,573,427 to Minsk et al.) or a blend of graphites (at a graphite-to-mixture weight ratio of 20-30%) (see, e.g., U.S. Pat. No. 5,707,171 to Zaleski et al.) for producing ECAC. U.S. Pat. No. 3,573,427 to Minsk et al. revealed that graphite particles could decrease the volume resistivity of asphalt concrete down to a range of 1-2 Ω·in. However, it has been proven that using graphite at high percentages, around 20%, can substantially reduce indirect tensile strength (Huang et al., "Effects of Electrically Conductive Additives on Laboratory-Measured Properties of Asphalt Mixtures," *J. Mater. Civ. Eng.* 21(10):612-617 (2009)), Marshall stability (Liu et al., "Study on the Graphite and Carbon Fiber Modified Asphalt Concrete," *Constr. Build. Mater.* 25(4):1807-1811 (2011)), resilient modulus (Liu et al., "Study on the Graphite and Carbon Fiber Modified Asphalt Concrete," *Constr. Build. Mater.* 25(4): 1807-1811 (2011)), and rutting dynamic stability of asphalt concrete (Liu et al., "Study on the Graphite and Carbon Fiber Modified Asphalt Concrete," *Constr. Build. Mater.* 25(4):1807-1811 (2011)).

U.S. Pat. No. 3,573,427 to Minsk et al. disclosed that conductor busses or cables were embedded in ECAC at 3 to 15 ft spacing, depending on an electric potential field applied that does not exceed 30V. U.S. Pat. No. 3,573,427 to Minsk et al., although did not disclose the performance durations, revealed that ECAC with copper conductors and thicknesses around 1 in are capable of completely clearing the surface off snow when the power applied is within the range of 10-40 W/ft². In U.S. Pat. No. 5,707,171 to Zaleski et al., the copper cables, with diameters half the thickness of conductive layer, were placed in a way such that the spacing between them caused a voltage drop of approximately 7 volts per foot, e.g., for a voltage of 120V, the cables had to be spaced in a range of 16 to 17 ft. U.S. Pat. No. 5,707,171 to Zaleski et al. disclosed that the number of copper cables were selected in a way such that preferably the current density in the copper cable was less than 1200 amps per square inch. Also, U.S. Pat. No. 5,707,171 to Zaleski et al. disclosed that the current density on the surface of copper electrodes was less than 0.25 amps per square foot and was less than 0.3 amps per square in the conductive layer so that the possibility of localized heating was minimized.

In U.S. Pat. No. 3,573,427 to Minsk et al., to produce electrically-conductive asphalt concrete, graphite particles were incorporated into hot mix asphalt ("HMA") in two different ways. In first method, graphite particles, at a high graphite-to-mixture weight ratio of 22%, were incorporated into HMA, in a pug mill at 350° F. In second method, the graphite particles, at a high graphite-to-mixture weight ratio of 30%, were first preheated at a temperature above 140° F., then, they were thoroughly blended in HMA, in a pug mill, and the temperature of the completed mix when discharged from the mill was within a range of 275° F. to 325° F. In U.S. Pat. No. 5,707,171 to Zaleski et al., the aggregates, bituminous fraction and graphite particles were blended at an off-site plant and shipped to a nearby application site. The aggregate was heated first and then the graphite was blended with the aggregate immediately before adding the bituminous fraction. U.S. Pat. No. 5,707,171 to Zaleski et al. disclosed that the timing of the addition of graphite to the aggregate fraction is very important. In a drum plant, where the aggregate is heated by introduction of hot air, addition of the graphite to the aggregate too early in the process can result in a major amount of the graphite being lost prematurely because of hot air blowing in the drum. To prevent graphite loss, the graphite can be pelletized prior to combining it with the aggregate. In a batch plant, also, the handling method used for adding the graphite to the aggregate can result in much of graphite being lost. Therefore, it is of paramount importance to appropriately combine the graphite, aggregate, and bituminous fraction.

It is worth mentioning that, some U.S. Patents such as U.S. Pat. No. 4,571,860 to Long and U.S. Pat. No. 6,193,793 to Long et al. have suggested using micro-wave generators for decreasing the bond developed between asphalt concrete surface and ice, so that the mechanical removal of ice can be facilitated. For example, U.S. Pat. No. 4,571,860 to Long disclosed that a micro-wave generator passing over the ice present on asphalt concrete can emit waves passing through the ice and heat up carbonaceous material in asphalt concrete leading to decreasing the bond between ice and pavement surface making it easier for a scraper to remove the ice. The information related to application of micro-waves provided in this embodiment is just additional material (i.e., an alternative approach) for removing ice from the surface of asphalt concrete and it is worth noting that micro-waves need a transparent layer such as ice for passing through. In other words, micro-waves cannot pass through the snow. As a result, emission of micro-waves is not an efficient approach for having surfaces free of ice and snow, compared with using electrically-conductive asphalt concrete for melting ice and snow.

The present application is directed to overcoming these and other deficiencies in the art.

SUMMARY

A first aspect of the present application relates to an electrically conductive asphalt mastic ("ECAM") composition. The ECAM composition comprises an asphalt binder, a mineral filler, and a plurality of conductive carbon microfibers, between 3 and 12 mm in length, with the conductive carbon microfibers being the sole source of electrical conductivity in the ECAM composition, wherein the mineral filler and the conductive carbon microfibers are dispersed in the asphalt binder, and wherein said conductive carbon microfibers are present in the ECAM composition in an amount of less than 2.00% of total volume of the ECAM composition.

A second aspect of the present application relates to an electrically conductive asphalt concrete ("ECAC") composition. The ECAC composition comprises an asphalt binder, a mineral filler, an aggregate, and a plurality of conductive carbon microfibers, where the conductive carbon microfibers are the sole source of electrical conductivity in the electrically conductive asphalt concrete composition.

A third aspect of the present application relates to a method of producing an electrically conductive asphalt concrete ("ECAC") composition. The method comprises providing the ECAC composition described herein; applying the ECAC composition onto a surface to be paved; and compacting the applied ECAC composition.

A fourth aspect of the present invention relates to a method of forming an electrically conductive asphalt concrete composition. The method includes mixing a mineral filler, an aggregate, and a plurality of conductive carbon fibers to form a carbon fiber-aggregate-filler blend, and drying the carbon fiber-aggregate-filler blend. The dried carbon fiber-aggregate-filler blend and an asphalt binder are preheated and then mixed to form the electrically conductive asphalt concrete composition.

A fifth aspect of the present application relates to an electrically conductive asphalt concrete ("ECAC") pavement. The ECAC pavement comprises a compacted asphalt concrete matrix and a plurality of conductive carbon microfibers dispersed in the compacted asphalt concrete matrix, where the conductive carbon microfibers are the sole source of electrical conductivity in the asphalt, and where the conductive carbon microfibers are positioned to effect resistance heating of the compacted asphalt concrete pavement upon application of an electrical current.

A sixth aspect of the present application relates to a system for heating pavement. The system comprises the electrically conductive asphalt concrete ("ECAC") pavement described herein; a plurality of electrodes positioned relative to the pavement so that electrical current can flow between the electrodes and through the pavement; a power supply connected to the plurality of electrodes; and an operation control system.

Carbon fiber, produced from either polyacrylonitrile (PAN) or pitch precursors (Chung et al, CARBON FIBER COMPOSITES (1st Ed.) (2012), which is hereby incorporated by reference in its entirety), is very compatible with asphalt concrete, because, like asphalt, it is made of carbon. The melting point of carbon fiber is approximately 1000° C. which makes it suitable to be utilized in asphalt mixtures. Abtahi et al., "Fiber-Reinforced Asphalt-Concrete—A Review," *Constr. Build. Mater.* 24(6):871-877 (2010), which is hereby incorporated by reference in its entirety. In addition to chemical and thermal compatibility, the high tensile strength of carbon fibers contributes to increased tensile strength of asphalt concrete (Abtahi et al., "Fiber-Reinforced Asphalt-Concrete-A Review," *Constr. Build. Mater.* 24(6): 871-877 (2010), which is hereby incorporated by reference in its entirety)—including resistance to thermal cracking. Arabzadeh, A., "The Influence of Different Mixture Design Variables on Thermal Fatigue Cracking of Asphalt Concrete Pavements," Middle East Technical University (2015) and Arabzadeh and Güler, "Influence of Mixture Design Variables on Thermal Coefficient of Asphalt Concrete," in *Proceedings of Conference on Advances in Civil Engineering*, pp. 1-6 (2014), which are hereby incorporated by reference in their entirety. With regards to the stiffening effect, carbon fibers increase the fatigue life of asphalt concrete. Abtahi et al., "Fiber-Reinforced Asphalt-Concrete—A Review," *Constr. Build. Mater.* 24(6):871-877 (2010), which is hereby incorporated by reference in its entirety. It has been reported that presence of CF can increase the fatigue life of asphalt concrete by approximately 10-25 orders of magnitude. Lee et al., "Fatigue Cracking Resistance of Fiber-Reinforced Asphalt Concrete," *Text. Res. J.* 75(2):123-128 (2005), which is hereby incorporated by reference in its entirety. It is believed that CF is the best conductivity enhancement material, when used in asphalt concrete. Wu et al., "Investigation of the Conductivity of Asphalt Concrete Containing Conductive Fillers," *Carbon N. Y.* 43(7):1358-1363 (2005), which is hereby incorporated by reference in its entirety. The reason for this good performance stems from the fact that high aspect ratio carbon fibers produce the longest conductive paths compared with other types of carbonaceous conductive fillers (Wu et al., "Investigation of the Conductivity of Asphalt Concrete Containing Conductive Fillers," *Carbon N. Y.* 43(7):1358-1363 (2005), which is hereby incorporated by reference in its entirety); fiber-to-fiber contact mechanism facilitates the conductive network formation and hence increases the electron transmission rate through the asphalt concrete (Wu et al., "Investigation of the Conductivity of Asphalt Concrete Containing Conductive Fillers," *Carbon N. Y.* 43(7):1358-1363 (2005), which is hereby incorporated by reference in its entirety). Although carbon fiber, with the resistivity of approximately $10^{-3}$ $\Omega$cm (Wu et al., "Investigation of the Conductivity of Asphalt Concrete Containing Conductive Fillers," *Carbon N. Y.* 43(7):1358-1363 (2005), which is hereby incorporated by reference in its entirety), can considerably increase the electrical conductivity of asphalt mixtures, it has one major drawback which is poor dispersion; CF has a high tendency to agglomerate into small or large clusters (Wu et al., "Investigation of the Conductivity of Asphalt Concrete Containing Conductive Fillers," *Carbon N. Y.* 43(7):1358-1363 (2005), which is hereby incorporated by reference in its entirety). Preparation of a well-dispersed CF modified asphalt concrete, with more than 8% CF, is not an easy task, especially by following conventional mixing techniques (Wu et al., "Investigation of the Conductivity of Asphalt Concrete Containing Conductive Fillers," *Carbon N. Y.* 43(7):1358-1363 (2005), which is hereby incorporated by reference in its entirety). It is reported, in the literature, that high aspect ratio CFs, even at very low volume contents, can substantially increase the electrical conductivity (Liu et al., "Study on the Graphite and Carbon Fiber Modified Asphalt Concrete," *Constr. Build. Mater.* 25(4):1807-1811 (2011), which is hereby incorporated by reference in its entirety).

Based on the provided information, it is of paramount importance to find a dosage rate of CFs suitable for producing ECAC. Percolation theory, in essence, is used to define how a given set of regularly or randomly positioned sites (e.g., CFs) is interconnected in a space. Pike and Seager, "Percolation and Conductivity: A Computer Study. I*," *Phys. Rev. B* 10(4):1421-1434 (1974), which is hereby incorporated by reference in its entirety. Based on this theory, at some critical probability—referred to as percolation threshold—an interconnected network of sites, is formed which causes the system to percolate at the span of the material under study. Weber and Kamal, "Estimation of the Volume Resistivity of Electrically Conductive Composites," *Polym. Compos.* 18(6):711-725 (1997), which is hereby incorporated by reference in its entirety. Percolation theory has been utilized in many different applications, such as spread of disease in a population, flow of a fluid in a porous medium, quarks in nuclear matter, and so on. Percolation theories, in the context of conductivity, are applied to explain the insulator-to-conductor transitions in materials composed of conductive filler(s) and an insulating matrix. Sandier et al., "Ultra-Low Electrical Percolation Threshold in Carbon-Nanotube-Epoxy Composites," *Polymer (Guildf)* 44(19):5893-5899 (2003), which is hereby incorporated by reference in its entirety. The sudden transition (from insulator to conductor) in these materials is evidence of a percolation threshold. Weber and Kamal, "Estimation of the Volume Resistivity of Electrically Conductive Composites," *Polym. Compos.* 18(6):711-725 (1997), which is hereby incorporated by reference in its entirety.

When a small amount of conductive materials are added to an insulating matrix, they are completely isolated and electrons cannot travel through the added conductive materials rendering the composite (e.g. "ECAC") still insulating. However, increasing the addition of conductive materials allows them to contact each other. The more the amount of conductive materials, the more they contact, and hence the more the conductivity of the composite. Addition of conductive materials causes a gradual increase in conductivity—i.e. a gradual decrease in resistivity. If the conductive material content reaches the threshold value, the first few continuous conductive paths will be formed in the composite enabling the travel of electrons through the sample. Liu et al, "Induction Healing of Porous Asphalt," *Transp. Res. Rec. J. Transp. Res. Board* 2305:98-101 (2012), which is hereby incorporated by reference in its entirety. Beyond the percolation threshold, addition of conductive materials results in gradual development and spreading of a conductive network in all three dimensions. Liu et al, "Induction Healing of Porous Asphalt," *Transp. Res. Rec. J. Transp. Res. Board* 2305:98-101 (2012), which is hereby incorporated by reference in its entirety. In other words, at this stage, addition of more conductive materials results in a sharp decrease in electrical resistivity. Adding conductive materials can continue up to an optimum value at which the conductive materials contact each other in all directions and many conductive networks and electron passages are formed. Liu et al, "Induction Healing of Porous Asphalt," *Transp. Res. Rec. J. Transp. Res. Board* 2305:98-101 (2012), which is hereby incorporated by reference in its entirety. As a result, after this stage, adding more conductive materials would not have any effect on decreasing the resistivity, and of course would not be economical. In this embodiment, the amount of CFs incorporated into asphalt concrete to produce ECAC is 1% which was obtained in another study (Arabzadeh et al, "Electrically-Conductive Asphalt Mastic: Temperature Dependence and Heating Efficiency," Mater. Des. 157:303-313 (2018), which is hereby incorporated by reference in its entirety) conducted on electrical properties of asphalt mastic (comprised asphalt binder, fillers/particles smaller than 75 microns, and carbon fibers (CF).

CFs can be incorporated into asphalt concrete following either the dry, wet or the method provided in the examples of this application. It is very important to identify a suitable mixing method, mixing speed, and mixing duration to obtain the best conductivity. Also, the source and length of CFs can influence the required compaction effort, electrical conductivity, volumetric properties, etc., of asphalt concrete which are all explained in the provided examples of this application.

The present application includes a novel composition of electrically-conductive asphalt concrete ("ECAC") made of carbon fiber ("CF"), a fabrication method of ECAC, and methods of incorporating CFs into asphalt concrete to produce an ECAC with optimum volumetric properties and efficient heating capacity. The significance of CF length and source on influencing the electrical and thermal properties of ECAC was determined as well as embedment of electrodes in an asphalt concrete slab at the laboratory environment which can be used in the field. Likewise, the present application applies ECAC as a resistive heating element for melting ice and snow (de-icing) or preventing their formation (anti-icing). The application of ECAC as a self-sensing material is also assessed, so that ECAC will be able to self-diagnose cracks or other distresses. The application further demonstrates ECAC self-sensing capability in the context of weigh-in-motion with applications in increasing the road safety, e.g., rerouting heavy traffic far from residential area. Utilizing the ECAC self-sensing feature for overload vehicles enforcement is also assessed in the present application. The streaming data obtained from ECAC could be integrated with operation centers, cameras, etc., for traffic monitoring which gives enough proof to police officers to enforce overload restrictions. The present application utilizes ECAC as a self-healing material by increasing the temperature up to a level at which asphalt binder can behave like a Newtonian fluid and then fill the cracks rejuvenating the pavement. Likewise, the present application applies ECAC for electromagnetic shielding of transformers and electronic devices housed in underground concrete vaults.

The ECAC of the present application can be used for multiple purposes such as resistive heating, sensing, electromagnetic interference shielding, and eliminating the build-up of surface electrical charges in industrial plants. Blending carbon fiber and aggregates in moist conditions, as disclosed in the present application, can significantly enhance the distribution of carbon fibers, and such methods of carbon fiber incorporation have not been previously reported in the literature or field. This application highlights the importance of carbon fiber length and source in terms of their influence on both mix design and heat generation efficiency of asphalt concrete, and further discloses that 3-mm carbon fibers are the best fiber types to be used in asphalt concrete for heated pavement applications.

BRIEF DESCRIPTION OF THE DRAWINGS

FIG. 1 shows 3-mm CFs obtained from both Source A and Source B (as described in Table 1, infra). As it can be seen, the CFs obtained from Source B are more bundled than those obtained from Source A; this can be attributed to the presence of moisture in the CFs of Source B.

FIGS. 5A-5D depict the influence of CF length on ECAC volumetric properties: specific gravities are shown in FIG. 5A, air voids are shown in FIG. 5B, voids in mineral aggregate are shown in FIG. 5C, and voids filled with asphalt are depicted in FIG. 5D.

FIGS. 8A-8D illustrate heat generation of ECAC slab. FIG. 8A shows thermographs obtained at the beginning of the test, FIG. 8B shows thermographs obtained after 5 minutes, FIG. 8C shows thermographs obtained after 10 minutes, and FIG. 8D shows thermographs obtained after 20 minutes.

FIGS. 9A-9D show ice-melting capability at time 0 (FIG. 9A), after 45 minutes (FIG. 9B), after 65 minutes (FIG. 9C), and after 75 minutes (FIG. 9D).

FIG. 10A shows a cross sectional view of the system for heating pavement. FIG. 10B shows a view of the system taken along line 3-3 of FIG. 10A. Also shown in FIG. 10B are the power/voltage source, the control unit, and wiring.

DETAILED DESCRIPTION

Figure 1:
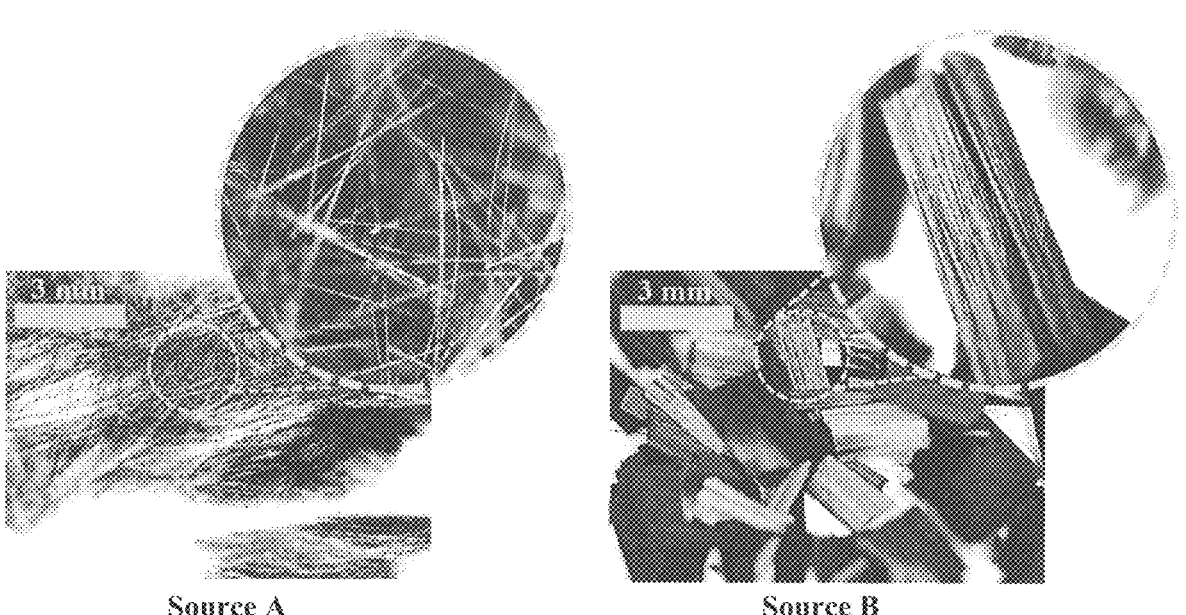
FIG. 1 shows the appearance of carbon fibers ("CF") from different sources. In particular.

A first aspect of the present application relates to an electrically conductive asphalt mastic ("ECAM") composition. The ECAM composition comprises an asphalt binder, a mineral filler, and a plurality of conductive carbon microfibers, between 3 and 12 mm in length, with the conductive carbon microfibers being the sole source of electrical conductivity in the ECAM composition, wherein the mineral filler and the conductive carbon microfibers are dispersed in the asphalt binder, and wherein said conductive carbon microfibers are present in the ECAM composition in an amount of less than 2.00% of total volume of the ECAM composition.

The asphalt binder useful in accordance with the present application may include, for example, unaged asphalt binder, aged asphalt binder from recycled asphalt pavement, vacuum tower distillation bottom binder, aged asphalt binder from recycled asphalt shingles, de-asphalting bottoms, residuum oil supercritical extraction unit bottoms, and mixtures thereof. An asphalt binder or asphalt binder composition in accordance with the present application may include a sticky, black, and highly viscous liquid or semi-solid form of petroleum residue which is used as the glue or binder for mixing with aggregate particles to create "asphalt mastic" or "asphalt concrete" for road construction.

An asphalt mastic composition in accordance with the present application includes a material resulting from the combination of asphalt binder and mineral filler (small aggregate particles with a maximum dimension less than 75 microns). An electrically conductive asphalt mastic ("ECAM") composition in accordance with the present application may include a material combining an asphalt binder, a mineral filler, and a carbon fiber to have heat generation capacity for heated pavement application (i.e., an asphalt binder, a mineral filler, and a carbon fiber (CF)).

In one embodiment, the ECAM composition can include asphalt additives. Suitable grades of asphalt additives include the following: PG52-22, PG58-22, PG64-22, PG67-22, PG70-22, PG76-22, PG82-22, PG52-28, PG58-28, PG64-28, PG67-28, PG70-28, PG76-28, PG52-34, PG58-34, PG64-34, PG64-16, PG67-16, PG70-16, PG76-16, PG64-10, PG67-10, PG70-10, PG76-10, pen grade 40-50, pen grade 60-70, pen grade 85-100, pen grade 120-150, AR4000, AR8000, AC10 grade, AC20 grade, and AC30 grade. Roberts et al., "Hot Mix Asphalt Materials, Mixture Design, and Construction," *NAPA Research and Education Foundation* (2nd ed.) (1996), which is hereby incorporated by reference in its entirety.

The conductive carbon microfibers (also referred to as carbon microfibers, carbon fibers, and CF herein) useful in accordance with the present application may include, for example, microfibers that have an aspect ratio of length (l)/diameter (d)) between 400 and 1,800. The aspect ratio (referred to herein as "s") is an important characterizing parameter of short fiber composites and is defined as the ratio between the length (l) and the diameter (d) of the fibers used as reinforcement. The value of s can vary depending on microfiber type and design. Aspect ratios can affect properties such as the strain to failure and toughness. A higher aspect ratio will result in lower values of strain at failure and toughness, due to angular particles inducing crack formation. The aspect ratio of the conductive carbon microfibers of the present application may be, for example, about 400, 450, 500, 550, 600, 650, 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, 1,800, or any value between 400 and 1,800. The aspect ratio may be, for example, in the range of between 800 and 1,800, between 800 and 900, or, alternatively, between 400 and 500. In one embodiment, the conductive carbon microfibers have an aspect ratio of length (l)/diameter (d)) between 400 and 1,800. In one embodiment, the conductive carbon microfibers are the sole source of elemental carbon in the ECAM composition.

In one embodiment of the present application, the composition comprises a mineral filler mixed with the composition. The mineral filler of the present application may include a particles with a diameter of less than 75 microns. For example, the diameter of the mineral filler particles may be between 10 and 74.9 microns, between 20 and 65 microns, between 30 and 55 microns, or any ranges there between. In one embodiment, the diameter of the mineral filler particles may have a diameter of, for example, 1 micron, 2 microns, 3 microns, 4 microns, 5 microns, 6 microns, 7 microns, 8 microns, 9 microns, 10 microns, 15 microns, 20 microns, 25 microns, 30 microns, 35 microns, 40 microns, 45 microns, 50 microns, 55 microns, 60 microns, 65 microns, 70 microns, or 74 microns. In one embodiment, the mineral filler may be uniformly distributed throughout the ECAM composition. In other embodiments, the mineral filler may be specifically distributed throughout the ECAM composition.

The ECAM composition of the present application provides an asphalt binder, a mineral filler, and a plurality of conductive carbon microfibers, a dispersion of the mineral filler and plurality of conductive carbon fibers in the asphalt binder achieves high electrical conductivity, largely as a result of fiber percolation through the composition. The volume fraction of carbon microfibers may be equal to, greater than, or less than the value which forms a continuous path of fibers touching on another. The range of fiber content at which electrical conductivity abruptly increases is known as the percolation transition zone (or percolation threshold).

The conductivity of the respective composite shows a dramatic change, by several orders of magnitude, around the threshold. This percolation phenomenon can be expressed by the following equation:

$$\sigma = \sigma_m(\varphi - \varphi_c)^t \qquad \text{Equation 1}$$

where $\sigma$ and $\sigma_m$ are the conductivities of composite and conductive phase, $\varphi_c$ is the threshold value of the volumetric fraction of the conductive phase, and t is a constant that is independent of the microstructure of the material.

The threshold value, $\varphi_c$, is a microstructure-dependent parameter. The most important factor influencing this parameter is the size of the conductive phase.

According to percolation theory, there are many clusters consisting of conductive particles in the composite when the volumetric fraction of the conductive phase is less than the threshold value, i.e. $\varphi < \varphi_c$. The average size of clusters can be expressed as follows $$L_{av} \propto \frac{1}{(\phi_c - \phi)^v} \qquad \text{Equation 2}$$

where $L_{av}$ is the average size of all clusters, and v is a positive constant.

It can be seen that $L_{av} \to \infty$ when $\varphi \to \varphi_c$. This implies that the conductive phase will become a continuous phase when the threshold value of $\varphi$ is reached. The composite will then become conductive. In one embodiment, the conductive carbon microfibers are electrically conductive.

Electrical properties of asphalt concrete are of concern in some applications where inadequate resistivity of concrete affects electrical signaling systems, such as railway ties, or in structures in which concrete is used for protection from stray currents. Electrical properties of concrete are also of interest in such applications as cathodic protection of reinforced concrete; electrical grounding; deicing of airport runways, and bridge decks, by electrical heating; and non-destructive testing of concrete.

In one embodiment, the carbon microfibers of the present application may include but are not limited to a polyacrylonitrile (PAN)-based carbon microfibers, Pitch-based virgin carbon microfibers, or recycled carbon microfibers, or any combination thereof. In one embodiment, the carbon microfibers are polyacrylonitrile (PAN)-based carbon microfibers. The carbon microfibers may range from between 3 and 12 mm in length. For example, the carbon microfibers may be between about 3 and about 7 mm in length, between 5 and 10 mm in length, and between 8-12 mm in length. The carbon microfibers may be, for example, 3 mm, 4 mm, 5 mm, 6 mm, 7 mm, 8 mm, 9 mm, 10 mm, 11 mm, 12 mm, or any variation in length between 3 and 12 mm. In one embodiment, the carbon microfibers are 3 mm in length.

The microfibers may be rectangular in shape with a deformed or corrugated surface to insure a bond with the ECAC. Carbon products are commercially available and have good quality control. U.S. Pat. No. 6,825,444 to Tuan et al., which is hereby incorporated by reference in its entirety, discloses a conductive concrete composition.

The volume fractions of carbon microfibers in the ECAM composition may be optimized to provide the required conductivity and adequate mechanical strength. A range for achieving optimal mechanical strength and uniform, stable heating is a concrete mixture containing carbon microfibers in an amount of less than 2.00% of total volume of the ECAM composition. For example, the carbon microfibers may be between 0.5% to 5% by total volume of the ECAM composition, or between 0.5% to 2% by total volume. More particularly, the conductive carbon microfibers may be present in an amount of about 1.0% by total volume. In one embodiment, the conductive carbon microfibers may be present in an amount of about 0.10%, about 0.20%, about 0.30%, about 0.40%, about 0.50%, about 0.60%, about 0.70%, about 0.80%, about 0.85%, about 0.90%, about 0.95%, about 1.0%, about 1.1%, about 1.2%, about 1.3%, about 1.4%, about 1.5%, about 1.6%, about 1.7%, about 1.8%, about 1.9%, or about 2.0% of the total volume. Mixtures in these ranges will provide good conductivity, high mechanical strength, and a smooth finished surface. Mixtures with more than these amounts of fibers may not as efficiently conduct an electrical current and, therefore, may not as efficiently heat the surface of a composition, or may create a rough surface. The appearance of the surface is similar to those of conventional asphalt concrete.

The ECAM composition may optionally include one or more additives. The conductive carbon fiber (CF) may serve as the primary source of electrical conductivity in the ECAM, thus, changing binder intrinsic properties will not have a considerable effect on asphalt mixture's conductivity. In fact, a wide array of polymeric modifiers can be used for improving binder properties. The modifier can be used for modifying rheological properties of the asphalt binder.

The additive may be a polymer additive, for example, a polyethylene, oxidized polyethylene, polyolefin, PE homopolymer, styrene-butadiene type polymer, and mixtures thereof. The polymer additive can include low molecular weight polymers, such as low, medium, or high density polyethylenes having a maximum viscosity of 1000 cps at 140° C. Other suitable polymers would include ethylenes and polypropylenes with melting points below 140° C. The polymer additive is preferably added at a concentration of up to about 1%, 5%, 10%, 15%, 20%, 25%, and 50% by weight of the ECAM composition.

The styrene-butadiene type polymer can include at least one of SB rubber, SBS linear type, SBS radial type, and SB sulphur linked type polymers, and the like. The ECAM composition may optionally include up to about 5% by weight styrene-butadiene type polymer. Any suitable polymer or mixture of different polymers can be used in producing polymer-modified ECAM composition. Non-limiting examples of suitable polymers include polyethylene, polypropylene, styrene/butadiene/styrene triblock copolymer, styrene/ethylenebutylene/styrene triblock copolymer, epoxy modified acrylate copolymer, ethylene/vinyl acetate copolymer, or mixture thereof.

The ECAM composition may optionally contain some further electrically conducting material such as iron ore, copper ore, or taconite. Since the electrical conductivity of copper is about six times that of iron, copper-rich aggregates may be used if increased conductivity is desired. Using conductive aggregates will reduce the volume of steel particles and fibers required to maintain stable electrical conductivity.

In one embodiment, the ECAM composition may have volume resistivity of between 1 $\Omega \cdot$cm and 50 $\Omega \cdot$cm. For example, the volume resistivity of the ECAM composition may range from between 5 $\Omega \cdot$cm and 45 $\Omega \cdot$cm, 10 $\Omega \cdot$cm and 40 $\Omega \cdot$cm, 15 $\Omega \cdot$cm and 35 $\Omega \cdot$cm, 20 $\Omega \cdot$cm and 30 $\Omega \cdot$cm, and any range there between. The volume resistivity may be, for example, 1 $\Omega \cdot$cm, 2 $\Omega \cdot$cm, 3 $\Omega \cdot$cm, 4 $\Omega \cdot$cm, 5 $\Omega \cdot$cm, 6 $\Omega \cdot$cm, 7 $\Omega \cdot$cm, 8 $\Omega \cdot$cm, 9 $\Omega \cdot$cm, 10 $\Omega \cdot$cm, 15 $\Omega \cdot$cm, 20 $\Omega \cdot$cm, 25 $\Omega \cdot$cm, 30 $\Omega \cdot$cm, 35 $\Omega \cdot$cm, 40 $\Omega \cdot$cm, 45 $\Omega \cdot$cm, or 50 $\Omega \cdot$cm.

A second aspect of the present application relates to an electrically conductive asphalt concrete ("ECAC") composition. The ECAC composition comprises an asphalt binder, a mineral filler, an aggregate, and a plurality of conductive carbon microfibers, where the conductive carbon microfibers are the sole source of electrical conductivity in the electrically conductive asphalt concrete composition.

An electrically conductive asphalt concrete ("ECAC") composition in accordance with the present application may include a material combining an asphalt binder, a mineral filler, a coarse aggregate, a fine aggregate, and conductive carbon fiber to provide heat generation capacity for a heated pavement application (i.e., an asphalt binder, a mineral filler, a coarse aggregate, a fine aggregate, and a carbon fiber ("CF")).

In one embodiment of the present application, the ECAC composition comprises a mineral aggregate mixed with the composition. The mineral aggregate may include a coarse aggregate and a fine aggregate. The mineral aggregate may be, for example, at least 75 microns in diameter. In one embodiment, the mineral aggregate may between 75 and 37,500 microns in diameter.

The mineral aggregate may include a fine mineral aggregate with particles having a diameter of between 75 and 4,750 microns. For example, the diameter of the fine mineral aggregate may be 75 microns, 80 microns, 85 microns, 90 microns, 95 microns, 100 microns, 125 microns, 150 microns, 200 microns, 250 microns, 300 microns, 500 microns, 750 microns, 1,000 microns, 1,500 microns, 2,00 microns, 2,500 microns, 3,000 microns, 3,500 microns, 4,000 microns, 4,500 microns, 4,750 microns, or any diameter there between. The fine aggregate may be, for example, crushed rocks, sand, and any combination thereof.

In one embodiment, the mineral aggregate is a coarse aggregate that is, for example, between 4,750 and 37,500 microns in diameter. For example, the diameter of the coarse aggregate may be 4,750 microns, 5,000 microns, 5,500 microns, 6,000 microns, 6,500 microns, 7,000 microns, 7,500 microns, 8,000 microns, 8,500 microns, 9,000 microns, 9,500 microns, 10,000 microns, 11,000 microns, 12,000 microns, 13,000 microns, 14,000 microns, 15,000 microns, 16,000 microns, 17,000 microns, 18,000 microns, 19,000 microns, 20,000 microns, 25,000 microns, 30,000 microns, 35,000 microns, 37,500 microns, and any diameter there between. The coarse aggregate may be, for example, coarse gravel, limestone, quartzite, granite, recycled geomaterials, and combinations thereof.

In one embodiment, the ECAC composition may further include a mineral filler. The mineral filler may have a diameter of less than 75 microns, as described supra in the present application.

The composition may include fine mineral aggregate only, coarse mineral aggregate only, any combination of coarse mineral aggregate and fine mineral aggregate, or any combination of coarse mineral aggregate, fine mineral aggregate, and mineral filler.

In one embodiment, the composition may further include fiberglass and a mineral aggregate such as lime dust and/or granular ceramic material that include elements of less than 0.063 mm and optionally aggregates originating from recycled materials, sand with grain sizes between 0.063 mm and 2 mm and optionally grit, containing grains of a size greater than 2 mm, and optionally alumina-silicates. Aluminosilicates are inorganic compounds based on aluminum and sodium silicates or other metal such as potassium or calcium silicates. Aluminosilicates reduce the viscosity of the warm-mix and are in the form of a powder and/or granulates. The term granulates refers to mineral and/or synthetic granulates, especially coated material aggregates, which are conventionally added to bituminous binders for making mixtures of materials for road construction.

To produce a suitable ECAC mixture, asphalt binder may in one embodiment sufficiently coat the aggregate system, so sufficient space between aggregate particles should be ensured; this space is referred to as voids in mineral aggregate ("VMA"). When CFs are incorporated into an aggregate system, they can vary the VMA, and this variation may be closely examined. In one embodiment, the composition may have a VMA value of between 15.0% and 20.0%. For example, the VMA value may be 15.0%, 16.0%, 17.0%, 18.0%, 19.0%, 20.0%, or any amount there between. A possible reason for obtaining the highest VMA value for ECAC containing 3-mm CF may, in one embodiment, be attributed to the superiority of 3-mm CF in terms of achieving uniform distribution; the longer the CF, the higher the possibility of fiber flocculation.

In addition to VMA, achieving required voids filled with asphalt ("VFA") is one of the critical design factors of HMA, because low VFA causes an unstable asphalt mixture. In one embodiment, the ECAC has a VFA value of between 60.0% and 80.0%. For example, the VFA may be 60.0%, 65.0%, 70.0%, 75.0%, 80.0%, or any amount there between. It is possible that increasing the CF length decreases the VMA and hence increases the resultant VFA. The optimum VFA, in one embodiment, may lie within a range that is defined based on both traffic level and the type of location, e.g., airfield or highway where the ECAC is implemented.

The ECAC composition may be optimized to provide the required conductivity and adequate mechanical strength. A range for achieving optimal mechanical strength and uniform, stable heating is an ECAC mixture comprising less than 10.0 wt % of the asphalt binder. For example, in one embodiment, the asphalt binder is between 0.01 wt % to 10 wt % of the ECAC, or between 4.0 wt % to 8.0 wt % of the ECAC. The asphalt binder may, for example, be present in an amount of about 0.01 wt %, 0.10 wt %, about 0.20 wt %, about 0.30 wt %, about 0.40 wt %, about 0.50 wt %, about 0.60 wt %, about 0.70 wt %, about 0.80 wt %, about 0.85 wt %, about 0.90 wt %, about 0.95 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.5 wt %, about 3.0 wt %, about 3.5 wt %, about 4.0 wt %, about 4.5 wt %, about 5.0 wt %, about 5.5 wt %, about 6.0 wt %, about 6.5 wt %, about 7.0 wt %, about 7.5 wt %, about 8.0 wt %, about 8.5 wt %, about 9.0 wt %, about 9.5 wt %, about 10.0 wt %, or any amount there between.

In one embodiment, the ECAC composition may have volume resistivity of between 15 $\Omega$·cm and 50 $\Omega$·cm. For example, the volume resistivity of the ECAM composition may range from 15 $\Omega$·cm and 45 $\Omega$·cm, 20 $\Omega$·cm and 40 $\Omega$·cm, 35 $\Omega$·cm and 35 $\Omega$·cm, or any range there between. The volume resistivity may be, for example, 15 $\Omega$·cm, 20 $\Omega$·cm, 25 $\Omega$·cm, 30 $\Omega$·cm, 35 $\Omega$·cm, 40 $\Omega$·cm, 45 $\Omega$·cm, or 50 $\Omega$·cm. In one embodiment, the ECAC composition may have volume resistivity of between about 15 $\Omega$·cm and about 50 $\Omega$·cm.

A third aspect of the present application relates to a method of producing an electrically conductive asphalt concrete ("ECAC") composition. The method comprises providing the ECAC composition described herein; applying the ECAC composition onto a surface to be paved; and compacting the applied ECAC composition.

A fourth aspect of the present invention relates to a method of forming an electrically conductive asphalt concrete composition. The method includes mixing a mineral filler, an aggregate, and a plurality of conductive carbon fibers to form a carbon fiber-aggregate-filler blend, and drying the carbon fiber-aggregate-filler blend. The dried carbon fiber-aggregate-filler blend and an asphalt binder are preheated and then mixed to form the electrically conductive asphalt concrete composition.

In particular, with regard to the third and fourth aspects of the present application, the steps used in the fabrication of ECAC include five primary steps. The first step includes mixing the carbon fiber (CF) and aggregate (including coarse aggregate and fine aggregate, and further including filler) with two to ten percent, such as four percent, of water by weight of the total blend. The second step includes drying the obtained CF-aggregate blend to ensure that there is no moisture. The CF-aggregate blend in accordance with the present application may include a combination of Carbon fiber (CF) and aggregate used in the production of "Electrically conductive asphalt mastic (ECAM)" and "Electrically conductive asphalt concrete (ECAC)" as described herein.

The third step in fabrication of the ECAC described herein includes pre-heating the dried CF-aggregate blend and asphalt binder. The fourth step includes mixing the CF-aggregate with the asphalt binder to get an ECAC mixture. The fifth step includes compacting the ECAC mixture. As described herein, the carbon fiber (CF) may be added with aggregate particles at first, and then mixed with asphalt binder to result in ECAC mixture.

Water may be used for preparing a CF-aggregate composition to uniformly distribute the carbon fiber with aggregates, and then the prepared CF-aggregate composition is pre-heated for a certain time (for example, three hours) at a high temperature (for example, 150° C.) before mixing with an asphalt binder. Thus, in one embodiment, there is no moisture in the mixture of (1) asphalt binder and (2) CF-aggregate, which eventually turn into ECAC after the compaction procedure following the mixing procedure (i.e., mixing the CF-aggregate composition with an asphalt binder).

This aspect of the application is carried out as described previously.

In one embodiment, an electrically conductive compacted asphalt concrete pavement is produced in accordance with the methods described herein.

A fifth aspect of the present application relates to an electrically conductive asphalt concrete pavement. The ECAC pavement comprises a compacted asphalt concrete matrix and a plurality of conductive carbon microfibers dispersed in the compacted asphalt concrete matrix, where the conductive carbon microfibers are the sole source of electrical conductivity in the asphalt, and where the conductive carbon microfibers are positioned to effect resistance heating of the compacted asphalt concrete pavement upon application of an electrical current.

This aspect of the application is carried out in accordance with previously described aspects.

In one embodiment, the conductive carbon microfibers are present in the compacted asphalt concrete matrix in an amount of less than 2.00% of total volume of the compacted asphalt concrete pavement.

A sixth aspect of the present application relates to a system for heating pavement. The system comprises the electrically conductive asphalt concrete pavement described herein; a plurality of electrodes positioned relative to the pavement so that electrical current can flow between the electrodes and through the pavement; a power supply connected to the plurality of electrodes; and an operation control system. Exemplary schematics of the system for heating pavement of the present application are shown in FIGS. 10A-10B.

Figure 10A:
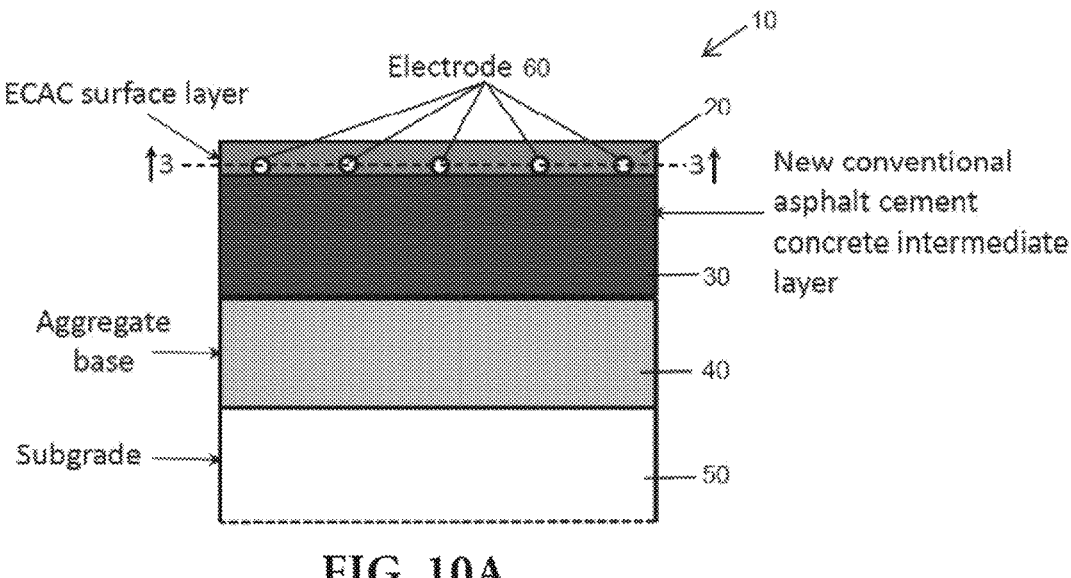
FIGS. 10A-10B are schematic illustrations for an exemplary system for heating pavement, as disclosed herein.

FIG. 10A shows a side cross-sectioned view of electrical conductive asphalt concrete pavement 10, including surface layer 20, asphalt cement concrete intermediate layer 30, aggregate base layer 40, and subgrade layer 50. Electrodes 60 are positioned in surface layer 20 near its interface with layer 30.

Figure 10B:
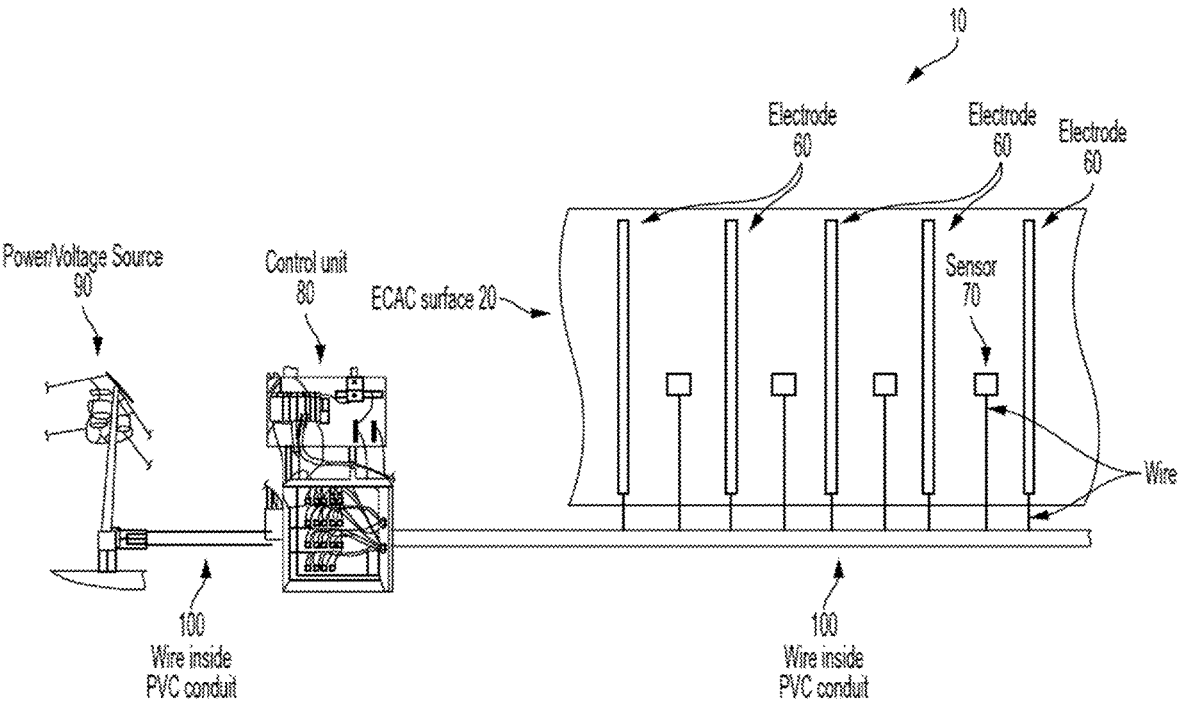

FIG. 10B is a schematic view which shows how electrodes 60 and sensors 70 are positioned in surface layer 20, sensors 70 are connected to control unit 80 and power/voltage source 90 is coupled to electrodes 60 by wires 100. Current from power/voltage source 90 passes to electrodes 60 when sensors 70 detect a temperature of asphalt concrete pavement 10 below a desired level. As a result, sensors 70 cause control unit 80 to generate a signal which causes power/voltage source 90 to send current to electrodes 60, thereby heating pavement 10.

This aspect of the application is carried out in accordance with previously described aspects.

In one embodiment, the operation control system includes one or more temperature sensors in the electrically conductive asphalt pavement and a controller coupling the one or more temperature sensors to the power supply, where, the controller causes the power supply to supply current to the electrodes in response to the temperature sensors. The temperature sensors can detect the temperature of the asphalt pavement at multiple and various points throughout the slab. Sensors may be connected to a control unit (i.e., controller) to permit voltage source to be turned on and off depending on the temperature of the slab. As a result, the slab will be heated or not heated.

The electrodes may be positioned relative to the conductive asphalt pavement so that electrical current is able to flow between the electrodes and through the asphalt pavement. The current flowing through the pavement is used to generate heat by conversion of electrical energy into heat as described supra. Electrodes can be in the form of a smooth circular bar conduit, a flat bar conduit, a hollow circular conduit, and any combination thereof. Electrodes may, in one embodiment, be stainless steel electrodes. Electrodes may range anywhere between 0.5 inches to 2.0 inches in diameter for a smooth circular bar electrode, 3/16 inch to 1.0 inch in thickness for a flat bar electrode, and 1/8 inch to 1.0 inch thick for a hollow circular bar electrode. Nylon may be used to anchor electrodes and prevent movement during placement of the electrically conductive asphalt composition as well as prevent leakage into the ground due to its resistance to corrosion and insulating properties. Electrodes may be anchored to the electrically conductive asphalt composition.

EXAMPLES

The following examples are provided to illustrate embodiments of the present application but they are by no means intended to limit its scope.

Example 1—Mixture Composition and Method for Design and Production of Electrically Conductive Asphalt Concrete A performance Grade (PG) 58-28 asphalt binder was used. Six types of CFs with different lengths (3, 6, and 12 mm) were obtained from two different commercial manufacturing companies/sources. FIG. 1 shows the appearance of carbon fibers ("CF") from different sources. In particular, FIG. 1 shows 3-mm CFs obtained from two sources (Source A and Source B as described in Table 1, infra). As it can be seen, the CFs obtained from Source B are more bundled than those obtained from Source A; this can be attributed to the presence of moisture in the CFs of Source B.

Both CF types (i.e., Source A and Source B) were manufactured using polyacrylonitrile (PAN). Table 1 presents the physical properties of the CFs obtained from each source.

TABLE 1

| Properties of carbon fibers | | |
| --- | --- | --- |
| Property | Source A | Source B |
| Type | PAN-based | PAN-based |
| Sizing | Unsized | Unsized |
| Carbon % | +94 | 95 |
| Melting Temperature, ° C. | +1000 | +1000 |
| Volume Resistivity(uil · m) | 17.2 | 15.5 |
| Diameter (urn) | 7.2 | 7.2 |
| Moisture Content % | 0 | 12.5% |
| Density (g/cm3) | 1.8 | 1.8 |
| Young Modulus (GPa) | 228 | 242 |
| Tensile Strength (GPa) | 3.8 | 4.1 |

Example 2—System Design

Figure 2:
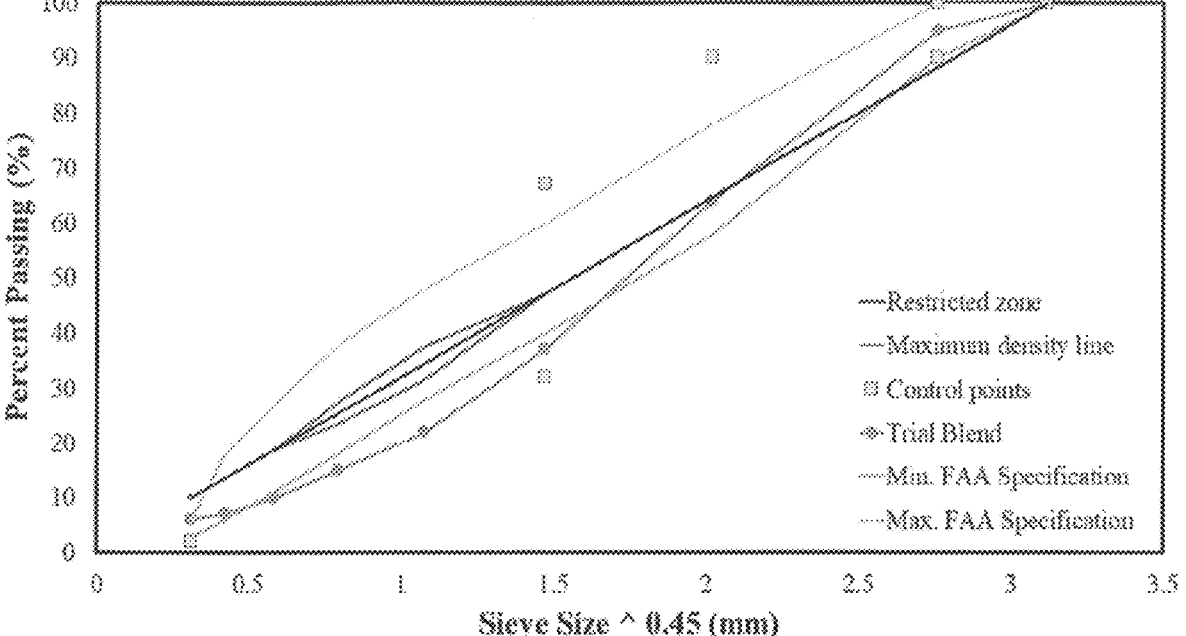
FIG. 2 shows an example of optimum aggregate gradation selected in a way such that different lengths of CF would have minimum influence on ECAC volumetric properties.

It should be noted that incorporation of CF into HMA increases the mixing time and required compaction effort. FIG. 2 shows an example of optimum aggregate gradation selected in a way such that different lengths of CF would have minimum influence on ECAC volumetric properties.

Figure 3:
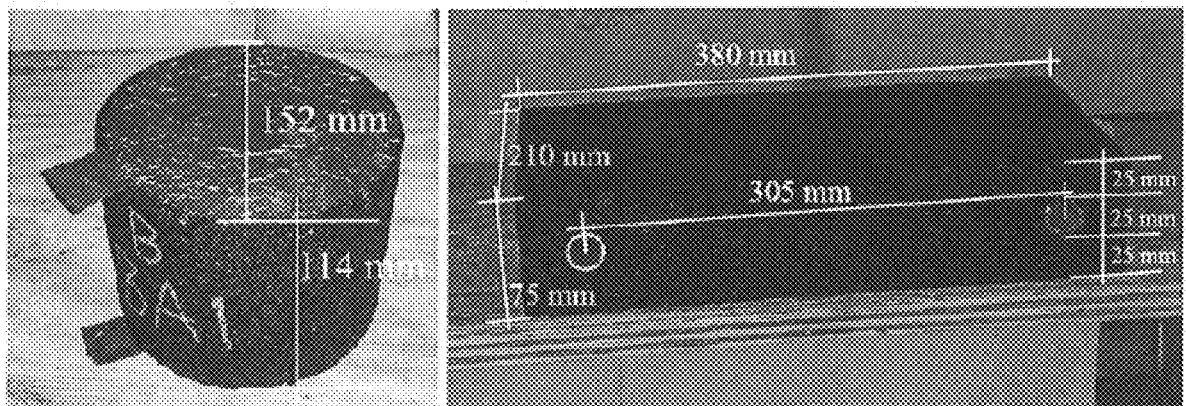
FIGS. 3A-3B depict a ECAC cylindrical specimen (FIG. 3A) and ECAC slab specimen (FIG. 3B).

In other studies (Arabzadeh et al, "Electrically-Conductive Asphalt Mastic: Temperature Dependence and Heating Efficiency," *Mater. Des.* 157:303-313 (2018) and Arabzadeh et al, "Investigating the Heat Generation Efficiency of Electrically-Conductive Asphalt Mastic Using Infrared Thermal Imaging," in *International Conference on Transportation and Development*, pp. 206-214 (2018), both of which are hereby incorporated by reference in their entirety), the authors showed that incorporation of 1% CF by total asphalt mastic volume results in significant improvement in electrical conductivity, so in this embodiment it was decided to use 1% of CF by total HMA volume, and for this percentage of CF, based on the several trial mix results, it was determined to use 6.3% asphalt content for fabricating all the specimens. To achieve a uniform distribution of CF in HMA and to overcome the CF distribution problem throughout the HMA, the CF was mixed in a Hobart mixer with aggregate in cold and wet condition—at 4% water content (based on weight of CF-aggregate blend)—for three minutes. The rationale behind mixing CF with aggregate under cold and wet conditions was to avoid flying (or missing) and flocculation of CFs during the mixing process to eventually obtain good CF distribution throughout the aggregate blend. The CF-aggregate blend was then placed in an oven set at 110° C. for 24 hours. The dried CF-aggregate blend and asphalt binder were placed in the oven and heated before mixing at a temperature of 150° C. for 3 and 2 hours, respectively; they were then mixed for 3 minutes at 150° C. Finally, the obtained mixtures were placed in an oven set at 135° C. for two hours to simulate short-term aging. It was decided to fabricate the entire cylindrical ECAC specimens at constant volume (2,078 cm³) and weight (4,700 gram) to ensure the volume and the weight of all specimens were identical to accurately evaluate the effects of different carbon fiber lengths on volumetric properties. Therefore, for each CF type, cylindrical specimens were prepared at a constant height of 114 mm. To perform the volume resistivity measurements followed by heating tests, copper foils (i.e., electrodes) were placed at the bottom and top of specimens before the beginning of the compaction process so that they would completely adhere to the specimens after compaction, ensuring good contact. FIG. 3A shows an ECAC specimen with copper foils at the top and bottom of the cylindrical specimen.

Example 3—System Performance

To simulate field performance and study the heat generation efficiency of ECAC with respect to melting ice/snow, an ECAC slab specimen (FIG. 3B) with three replicates was fabricated at the optimum CF-type identified based on analyses performed on the data obtained from 6-in cylindrical gyratory specimens. Each slab was compacted using two lifts; first, a 25-mm (approximately 1-inch) lift of ECAC (of about a thickness of 3 inches) was compacted, and then steel pipes (i.e., electrodes) were embedded. After that, the second lift of ECAC (at about a thickness of 3 inches) was compacted.

To perform volume resistivity measurements and then characterize heat generation efficiencies and ice melting capability, all the ECAC specimens (both cylindrical and slab types) were placed in an environmental chamber set at −20° C. for at least 4 hours.

Volume resistivity is an intrinsic material property that quantifies a material's ability to allow passage of electric current flow. Lowrie, W., FUNDAMENTALS OF GEOPHYSICS, Cambridge University Press (2007), which is hereby incorporated by reference in its entirety. The lower the volume resistivity of a material, the higher the capability of the material to conduct electricity. The volume resistivity of the ECAC specimens was measured using two types of probes (i.e., copper foils on cylindrical specimens or pipes embedded within slab specimens). A FLIR DM 62 digital multimeter was employed to measure resistance values at −20° C. All volume resistivity measurements were performed in the environmental chamber so that variations in temperature could not influence the obtained resistivity values. It is also worth noting that all the resistivity measurements were performed on a wood base to ensure insulation against electric current leakage.

To evaluate the heating performance of the ECAC specimens, a FLIR T650sc IR camera with a resolution of 640×480 pixels was used to measure the surface temperature of the ECAC specimens at the environmental temperature set at −20° C. After conditioning the ECAC specimens, an AC voltage of 40 V at a frequency of 64 Hz was applied for a duration of 20 minutes. The acquired data were then analyzed using the ResearchIR Max® software package, and the heat generation efficiency was evaluated.

Figure 4:
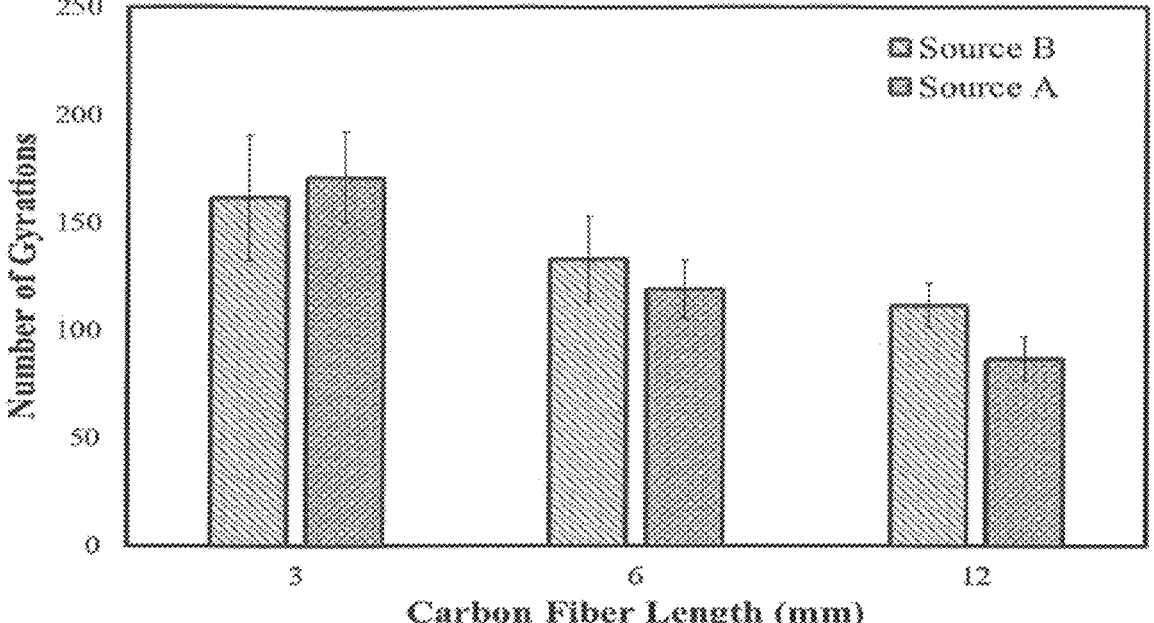
FIG. 4 illustrates the influence of carbon fiber source and length on compaction level.

An asphalt mixture typically consists of aggregates, asphalt binder, and voids. Incorporation of CFs into asphalt mixture changes the HMA volumetric properties. Cleven, M. A., "Investigation of the Properties of Carbon Fiber Modified Asphalt Mixtures," Michigan Technological University (2000), which is hereby incorporated by reference in its entirety. As described earlier, all the ECAC cylindrical specimens were prepared at a constant volume (2,078 cm$^3$) and weight (4,700 gram). Due to this specimen preparation, the compaction level of ECAC specimens—each specimen having three replicates—was recorded (see FIG. 4), so that the effect of CF length on the number of gyrations (for obtaining a height of 114 mm) could be identified. FIG. 4 presents the compaction effort for all the ECAC specimens modified with different lengths and sources of CF. As it can be seen, increasing the CF length decreases the required number of gyrations. Indeed, specimens modified with 3-mm CFs (from both sources) required a higher compaction effort that can be attributed to better distribution of 3-mm CFs compared with longer ones. Using shorter CFs increases the number of voids in the ECAC, resulting in more compaction effort required to achieve the target specimen volume.

FIG. 5A shows the influence of CF length on maximum theoretical specific gravity ($G_{mm}$) and bulk specific gravity ($G_{mb}$). According to FIG. 5A, when CF length increases, $G_{mm}$ decreases while $G_{mb}$ increases. As a result of such specific gravity changes, the air void volume within the asphalt mixture is decreased (FIG. 5B). It is worth noting that, based on observations of this embodiment, since the source of CF has a relatively insignificant effect on volumetric properties, the volumetric property results presented in FIGS. 5A-5D are the arithmetic means of the values calculated for each CF length from both sources A and B. As mentioned earlier, increasing CF length decreases the amount of ECAC air voids. Considering that the amount of CF used for modifying ECAC specimens in this embodiment was kept at a constant volume content of 1%, this behavior can be attributed to the fact that, at such a constant content of CF (i.e., 1%), shorter fibers are more omnipresent than longer fibers in the mixture.

To produce a good and workable ECAC mixture, asphalt binder should sufficiently coat the aggregate system, so sufficient space between aggregate particles should be ensured; this space is referred to as voids in mineral aggregate ("VMA"). Chadbourn et al, "The Effect of Voids in Mineral Aggregate (VMA) on Hot-Mix Asphalt Pavements," in *No. MN/RC*-2000-13 (1999), which is hereby incorporated by reference in its entirety. When CFs are incorporated into an aggregate system, they can vary the VMA, and this variation must be closely examined. Cleven, M. A., "Investigation of the Properties of Carbon Fiber Modified Asphalt Mixtures," Michigan Technological University (2000), which is hereby incorporated by reference in its entirety. FIG. 5C presents the influence of CF length on changing the VMA and, as can be seen, there is a drastic reduction in VMA when CF length increases from 3 to 6 mm while increasing CF length from 6 to 12 mm has a negligible influence on VMA reduction. The reason for obtaining the highest VMA value for ECAC containing 3-mm CF can be attributed to the superiority of 3-mm CF in terms of achieving uniform distribution; the longer the CF, the higher the possibility of fiber flocculation. In addition to VMA, achieving required voids filled with asphalt (VFA) is one of the critical design factors of HMA, because low VFA causes an unstable asphalt mixture. Increasing CF length increases the VFA (FIG. 5D) in specimens containing the same asphalt content and prepared at the same volume. It can be concluded that increasing the CF length decreases the VMA and hence increases the resultant VFA. It is worth noting that the optimum VFA must lie within a range that is defined based on both traffic level and the type of location, e.g., airfield or highway where the ECAC is implemented.

TABLE 2

| Resistivity measurement results of ECAC specimens at –20° C. | | | |
| --- | --- | --- | --- |
| | | Resistivity (Ω · cm) | |
| Source | Length (mm) | Ave. | SE |
| A | 3 | 96 | 14 |
| | 6 | 250 | 45 |
| | 12 | 801 | 33 |
| B | 3 | 168 | 13 |
| | 6 | 166 | 6 |
| | 12 | 258 | 20 |

According to Table 2, the volume resistivity of ECAC modified with CF increases with increasing in fiber length, and such volume resistivity increase was the greatest in ECAC specimens fabricated with CFs obtained from source A. For CFs obtained from Source A, while increasing the fiber length results in increase of volume resistivity, there is no such consistent trend observed in the volume resistivities of CFs obtained from Source B.

Figure 6:
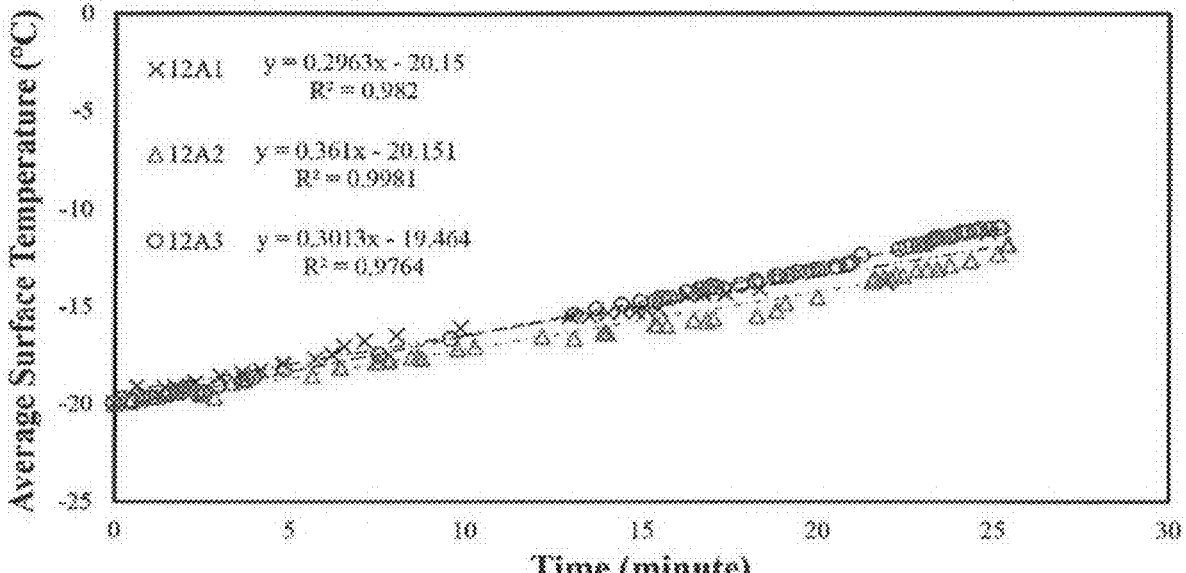
FIG. 6 shows the result of a heating test for 12-mm CF produced by Source A (of Table 1, infra).

As mentioned earlier, a heating test was performed on each cylindrical ECAC specimen in an environmental chamber set at –20° C. The heating test results presented in FIG. 6 were obtained from the three replicates of ECAC modified with 12-mm CF obtained from Source A. As can be seen, the specimen surface temperature increases linearly, and this trend was observed in all the ECAC specimens modified with CFs from different sources and of different lengths. The slope of surface temperature versus time was also calculated to determine the heat generation rate for each cylindrical specimen, and this rate was used to evaluate the effect of CF length and source on heat generation efficiency (see FIG. 7).

Figure 7:
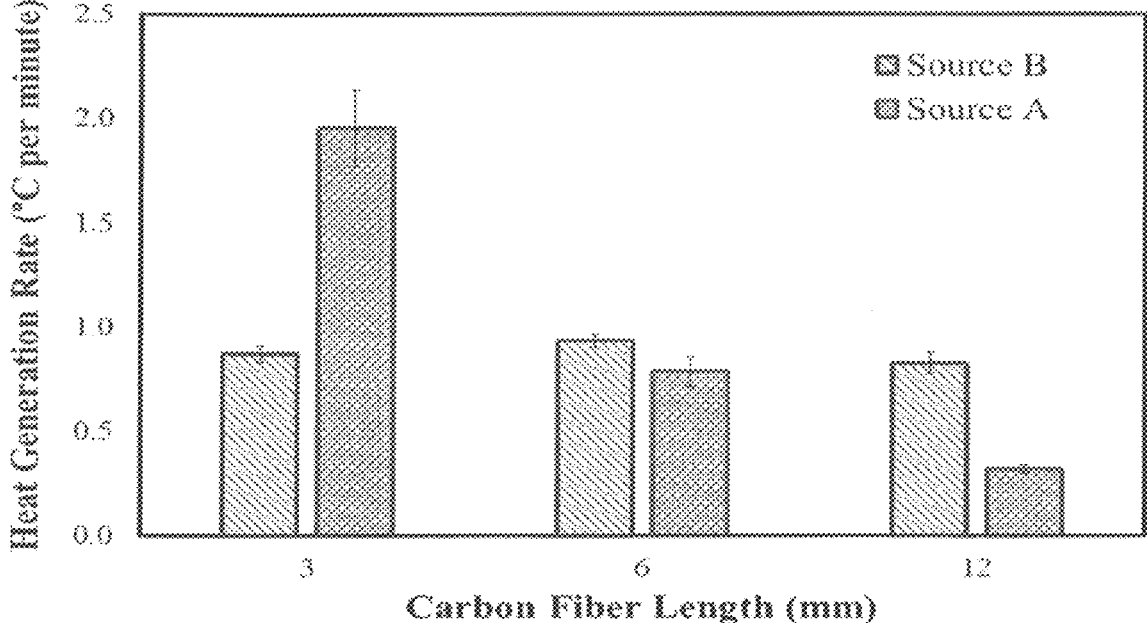
FIG. 7 depicts the influence of CF length and source on heat generation rate.

According to FIG. 7, 3-mm CF obtained from Source A resulted in the highest heat generation rate. Increasing CF length caused a substantial decrease in the heat generation rate of the specimens fabricated with CFs obtained from source A; the shorter the CFs (e.g., the ones obtained from source A), the better the distribution. While there was no considerable difference between heat generation rates of ECAC specimens made of CFs obtained from Source B, consistent with volume resistivity measurements performed on ECAC specimens made of CFs obtained from Source B, no consistent trend was observed in the volume resistivities of ECAC specimens made of CFs (of different lengths) obtained from Source B. This might be related to the fact that CFs obtained from Source B, when dried at 110° C. to remove added water, become more brittle. It is worth noting that, based on observations of this embodiment, during the asphalt mixture mixing process, the longer CFs (6 and 12-mm) were more prone to breakage into shorter pieces, and because of such brittle behavior, there was no significant difference observed between the heat generation rate of ECAC specimens fabricated with 3, 6, or 12-mm CFs obtained from source B.

As mentioned earlier, ECAC slabs were fabricated based on the analyses performed on the data obtained from cylindrical ECAC specimens. As a result, the 3-mm CF obtained from Source A was incorporated into HMA to fabricate an ECAC slab with three replicates. The volume resistivity measurements and heat generation evaluation were all conducted under conditions similar to those used in cylindrical ECAC specimen evaluations. The average volume resistivity of ECAC's three replicates became 35 Ω·cm, with a standard error of 1.1 Ω·cm. The heating-test results revealed that the average heat generation rate for the ECAC slab was 1° C. per minute when subjected to an electric potential of 40V. FIG. 8A presents the slab surface temperature at the beginning of the test. Note that in FIGS. 8B and 8C the temperature on the slab surface increases with respect to time. FIG. 8D shows the heating test results after 20 minutes, where it can be seen that most surface temperatures (i.e., pixels) rose to 5° C. With such performance, it would be expected that the ECAC slab, after application of a low voltage of 40V for 20 minutes, can produce a surface free of snow/ice.

The central goal of heated pavements is to provide ice- and snow-free pavement surfaces in airports during cold winters. For proving such capability of ECAC, one of the ECAC slabs was tested under a worst-case scenario, i.e., it was tested for its ability to melt a dense layer of ice at an environmental temperature of –20° C. As a general fact, because of the high density of ice compared with snow, since an ice layer requires more energy (in the form of heat) from the pavement surface to melt and vanish (Paterson, W. S. B., THE PHYSICS OF GLACIERS (1994), which is hereby incorporated by reference in its entirety), one of the slab surfaces was covered by a dense 20-mm ice layer. The presence of water and ice within the air voids of ECAC slab caused a significant reduction in the ECAC electrical resistivity by changing the volume resistivity from 35 to 16 Ω·cm. It is worth noting that none of the prior art disclosed such enhancement in volume resistivity.

Due to such volume resistivity reduction and to avoid a short-circuit condition, it was decided to expose the ECAC slab to an electric potential field of 30V rather than 40V. In the ice-melting process, total melting time and time duration of applied electrical power are the most significant factors influencing the ice-melting process of the ECAC slab, and the specimen should also not be allowed to overheat. Due to the low resistivity of the slab, since the asphalt binder can easily reach to its melting point, it was decided to turn off the power for some time during the ice-melting process to avoid overheating. The electrical power was applied for two time intervals during the ice-melting process. After 30 minutes of applying power (i.e., minute 0 to minute 30), the power was turned off for 20 minutes to avoid overheating of the slab (i.e., from minute 30 to minute 50), followed by power applied for 10 more minutes (i.e., from minute 50 to minute 60). FIG. 9A shows the slab covered with a 20 mm dense layer of ice at the beginning of the test. FIGS. 9B and 9C reflect the ice-melting process of ECAC slab over time. Finally, after 15 minutes of applying no electrical power (i.e., minute 60 to minute 75), the ice layer had been eliminated by the heat trapped in the ECAC when the power had been off following minute 60 (FIG. 9D). In summary, the ice-melting process took about 75 minutes, and during this time the voltage was applied for only 30 minutes over the two aforementioned time intervals. It can be concluded that ECAC's high heating capacity makes it a potentially applicable alternative for mitigating winter-related maintenance problems of paved surfaces such as roads, sidewalks, bridges, airfield runways and taxiways, etc.

Although preferred embodiments have been depicted and described in detail herein, it will be apparent to those skilled in the relevant art that various modifications, additions, substitutions, and the like can be made without departing from the spirit of the application and these are therefore considered to be within the scope of the application as defined in the claims which follow.

What is claimed:

1. An electrically conductive asphalt concrete composition (ECAC) comprising:

an asphalt binder;

a mineral filler;

an aggregate; and a plurality of conductive carbon microfibers, wherein said conductive carbon microfibers are the sole source of electrical conductivity in the electrically conductive asphalt concrete composition, and wherein the electrically conductive asphalt concrete composition has a volume resistivity of between about 15 Ω·cm and about 50 Ω·cm.

2. The ECAC composition of claim 1, wherein said conductive carbon microfibers are present in the electrically conductive asphalt concrete composition in an amount of less than 2.00% of total volume of the electrically conductive asphalt concrete composition.

3. The ECAC composition of claim 1, wherein the aggregate comprises a coarse aggregate and a fine aggregate.

4. The ECAC composition of claim 1, wherein the mineral filler comprises particles with a diameter of is-less than 75 microns.

5. The ECAC composition of claim 3, wherein the mineral aggregate comprises a fine aggregate having particles with a diameter of between 75 and 4,750 microns.

6. The ECAC composition of claim 3, wherein the aggregate comprises a coarse aggregate having particles with a diameter of between 4,750 and 37,500 microns.

7. The ECAC composition of claim 3, wherein the fine aggregate is selected from the group consisting of crushed rocks, sand, and combinations thereof.

8. The ECAC composition of claim 3, wherein the coarse aggregate is selected from the group consisting of coarse gravel, limestone, quartzite, granite, recycled geomaterials, and combinations thereof.

9. The ECAC composition of claim 1, wherein the conductive carbon microfibers are selected from the group consisting of polyacrylonitrile (PAN)-based carbon microfibers, pitch-based virgin carbon microfibers, recycled carbon microfibers, and combinations thereof.

10. The ECAC composition of claim 1, wherein the conductive carbon microfibers are between 3 and 12 mm in length.

11. The ECAC composition of claim 1, wherein the asphalt binder is selected from the group consisting of unaged asphalt binder, aged asphalt binder from recycled asphalt pavement, vacuum tower distillation bottom binder, aged asphalt binder from recycled asphalt shingles, de-asphalting bottoms, residuum oil supercritical extraction unit bottoms, and mixtures thereof.

12. The ECAC composition of claim 1, wherein the electrically conductive asphalt composition has a void filled with asphalt value of between 60.0% and 80.0%.

13. The ECAC composition of claim 1, wherein the electrically conductive asphalt concrete composition comprises less than 10.0 wt % of the asphalt binder.

14. The ECAC composition of claim 13, wherein the electrically conductive asphalt concrete composition comprises between 4.0 wt % and 8.0 wt % of the asphalt binder.

15. The ECAC composition of claim 1, wherein the aggregate is uniformly distributed throughout the electrically conductive asphalt concrete composition.

16. A method of producing an electrically conductive asphalt concrete composition comprising:

providing the electrically conductive asphalt concrete composition of claim 1;

applying the electrically conductive asphalt concrete composition onto a surface to be paved; and compacting the applied electrically conductive asphalt concrete composition.

17. The method of claim 16, wherein said providing the electrically conductive asphalt concrete composition comprises:

mixing the mineral filler, the aggregate, and the plurality of conductive carbon microfibers to form a carbon fiber-aggregate-filler blend;

drying the carbon fiber-aggregate-filler blend;

preheating the dried carbon fiber-aggregate-filler blend and the asphalt binder; and mixing the pre-heated, dried carbon fiber-aggregate-filler blend and the pre-heated asphalt binder to form the electrically conductive asphalt concrete composition.

18. The method of claim 17, wherein the conductive carbon microfibers are between 3 and 12 mm in length.

*    *    *    *    *